United States Patent [19]

Mathewson, II

[11] Patent Number: 5,649,101

[45] Date of Patent: Jul. 15, 1997

[54] SYSTEM AND METHOD FOR IMPROVING 3270 DATA STREAM PERFORMANCE BY REDUCING TRANSMISSION TRAFFIC

[75] Inventor: James Merwin Mathewson, II, Chapel Hill, N.C.

[73] Assignee: International Business Machines Corporation, Armonk, N.Y.

[21] Appl. No.: 569,322

[22] Filed: Dec. 8, 1995

Related U.S. Application Data

[63] Continuation of Ser. No. 116,640, Dec. 3, 1993, abandoned.

[51] Int. Cl.$^6$ .................................................. G06F 13/00
[52] U.S. Cl. .......................... 395/200.02; 395/200.16; 395/200.17; 395/850
[58] Field of Search ......................... 395/200.02, 200.16, 395/200.17, 200.2, 823, 849, 850, 200.01

[56] References Cited

U.S. PATENT DOCUMENTS

| | | | |
|---|---|---|---|
| 4,240,139 | 12/1980 | Fukuda et al. | 395/421.05 |
| 4,445,176 | 4/1984 | Burk et al. | 395/200.14 |
| 4,750,137 | 6/1988 | Harper et al. | 364/514 R |
| 4,837,679 | 6/1989 | Wiles, Jr. et al. | 395/250 |
| 5,005,137 | 4/1991 | Ernst | 364/514 C |
| 5,010,514 | 4/1991 | Kippenhan et al. | 395/275 |
| 5,247,616 | 9/1993 | Berggren | 395/200.08 |

*Primary Examiner*—Parshotam S. Lall
*Assistant Examiner*—Viet Vu
*Attorney, Agent, or Firm*—Michael Q. Lee; Stephen T. Keohane

[57] ABSTRACT

An improved 3270 data stream architecture to eliminate data bytes in the 3270 data stream to improve line utilization and reduces network costs. First, a 6-bit increment option has been added to the addressing options for the buffer control orders to reduce the number of address bytes in the set buffer address (SBA) order, repeat to address (RA) order, and the erase unprotected to address (EUA) order. Second, a reduced Start Field (SF) and repeat to address (RA) orders are implemented with utilizing a modified Set Attribute (SA) order to designate the field attribute character and repeat character. The SF and RA orders following the SA order in the data stream are reduced in length. Third, a Modify Existing Format has been implemented which provides a means of modifying a format load that is currently in the format storage of the outboard device without having the host application program resend the entire format when only a small portion of the format needs to be modified. Specifically, the Load Format Structured Field has been modified to add the modify existing format fields to modify specified portions of the Load Format Structured Field without having to retransmit the entire field. Lastly, to enable a host application to selectively determine when to reset the Format Group rather than resetting the Format Group Selection automatically prior to being able to use a loaded format, a modified Set Partition Characteristics structured field is used by the host application to selectively enable and disable the Local Format Storage feature.

44 Claims, 13 Drawing Sheets

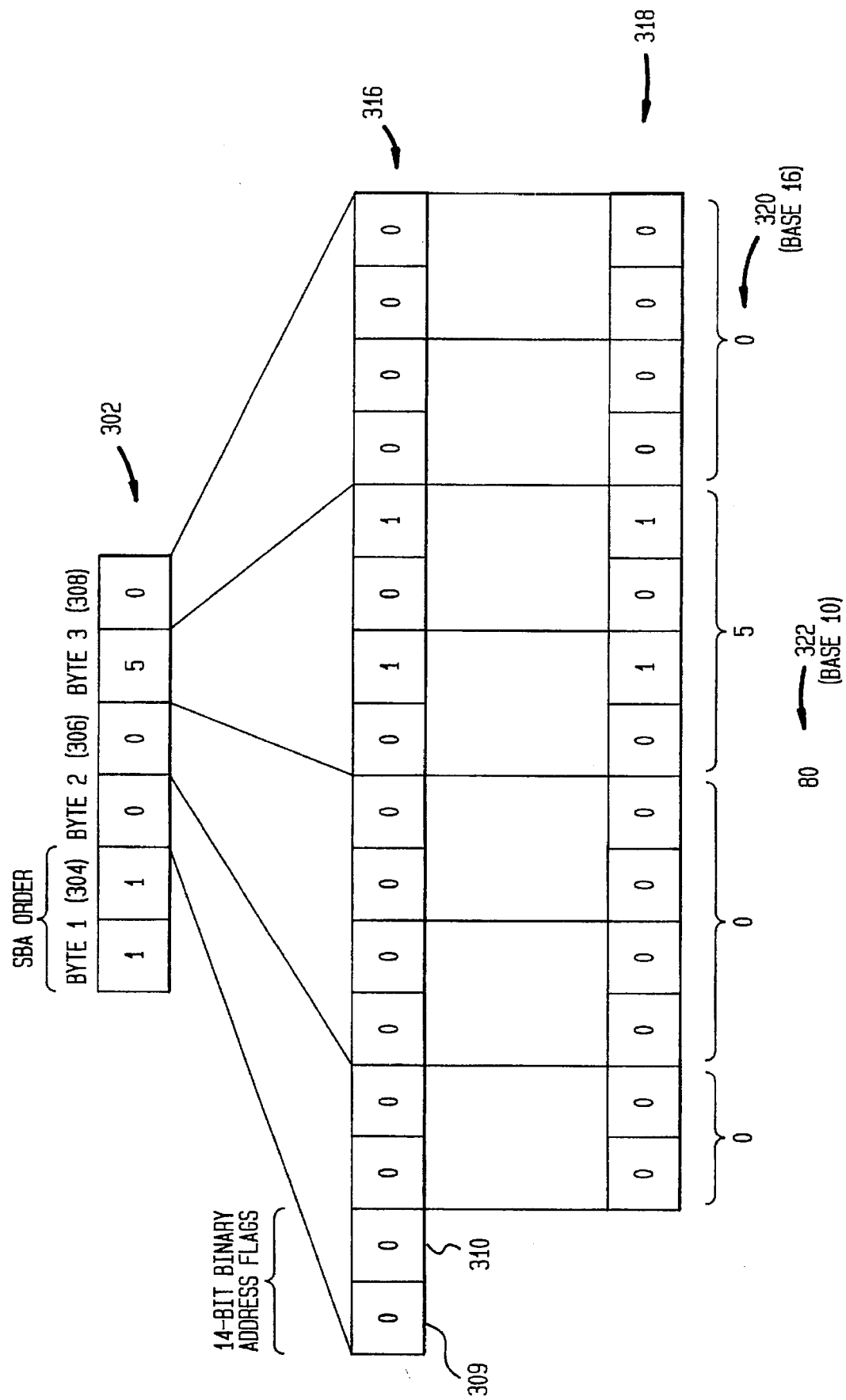

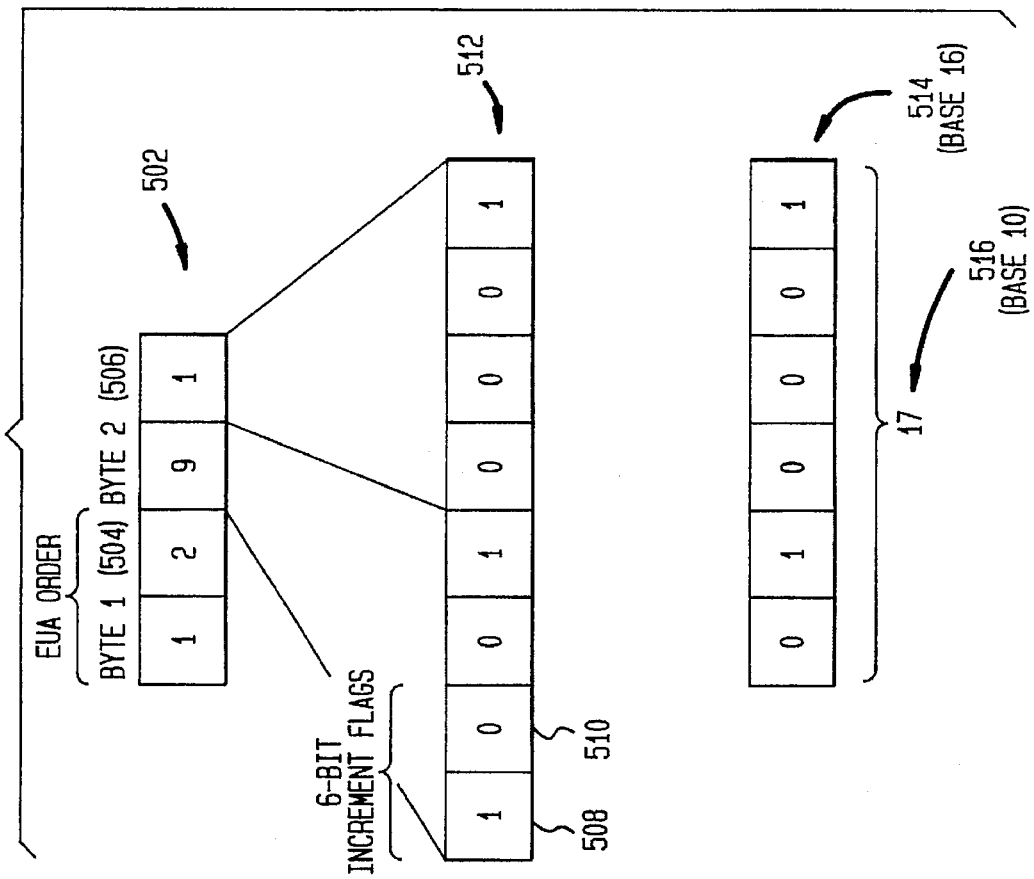
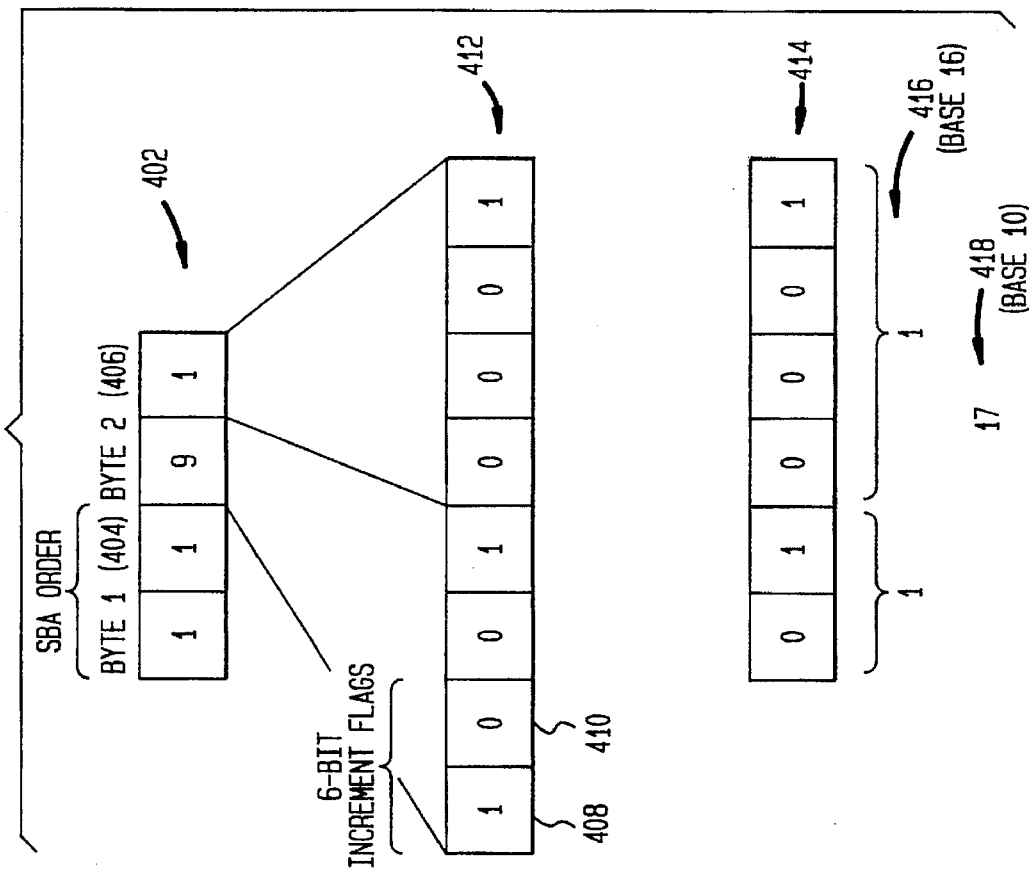

1204: RA ORDER STOP ADDRESS = 5 REPEAT CHAR. = X'D1' = "J"

1206: RA ORDER REPEAT TO ADDRESS REPEAT CHAR. = X'E2' = "S"

1208: RA ORDER STOP ADDRESS = X'A' = 10

1210: ALPHANUMERICS "ABC"

1212: RA ORDER STOP ADDRESS = X'10' = 16

1214: JJJJ

1216: SSSSS

1218: ABC

1220: SSS

```
  1   2   3   4   5   6   7   8   9  10  11  12  13  14  15  16
┌───┬───┬───┬───┬───┬───┬───┬───┬───┬───┬───┬───┬───┬───┬───┬───┐
│ J │ J │ J │ J │ S │ S │ S │ S │ S │ S │ A │ B │ C │ S │ S │ S │
└───┴───┴───┴───┴───┴───┴───┴───┴───┴───┴───┴───┴───┴───┴───┴───┘
```
← 1222

SYSTEM AND METHOD FOR IMPROVING 3270 DATA STREAM PERFORMANCE BY REDUCING TRANSMISSION TRAFFIC

This application is a continuation of application Ser. No. 08/161,640, filed Dec. 3, 1993, now abandoned.

DESCRIPTION

1. Technical Field

The present invention relates generally to computer networks, and, more particularly, to techniques which improve the transmission traffic in systems utilizing the IBM 3270 Data Stream Architecture.

2. Background Art

Data processing systems are known where a plurality of display systems communicate with a central host computer via a 3270 data stream. These display systems typically include a base unit which supports a keyboard for operation as a keyboard/display terminal that communicates with the host via a controller. The terminal may interface with a plurality of features connected thereto such as a card reader or a light pen. The base unit and the features receive transmissions from a controller and also transmits to the controller. Typical of such systems are the IBM Information Display System, the IBM 3274 control unit, and the IBM 3278 display stations. In such systems, the display stations are used to access data and run programs on the host computer.

One of the critical resources in the exchange of information between the host processors and the various devices is the transmission media that is used to move the information between an application and a user. Because of this, a number of different schemes have been developed to reduce the amount of data being transmitted to achieve a given operation.

One conventional solution to reduce transmission traffic which was implemented in the original 3270 Data Stream architecture was to suppress the nulls in an inbound read modified operation. The reduction in transmission traffic achieved by this approach has resulted in minimal increases in transmission efficiency.

Another conventional technique which has been used has been the implementation of format storage techniques. This approach has enabled applications to transmit data one time that could be used many times over. However, this improvement has not been found sufficient to meet the increased host processing speeds and data transmission rates presently available.

Thus, what is needed is an improvement to the IBM 3270 Data Stream architecture which will increase transmission efficiency by reducing transmission traffic.

SUMMARY OF THE INVENTION

The present invention is an improvement to the 3270 data stream architecture. Specifically the improvements are to five aspects of the 3270 data stream architecture. They are (1) reduction in buffer control order address size, (2) reduction in the start field order to a single byte, (3) reduction in the length of repeat to address order, (4) implementation of a method for modifying existing formats, and (5) inhibition of reset of format group transmission.

First, a 6-bit increment option has been added to the addressing options for the buffer control orders which use addressing to take advantage of the fact that the specified address in these orders are typically 64 bytes or less from the current buffer address. They are the set buffer address (SBA) order, repeat to address (RA) order, and the erase unprotected to address (EUA) order.

Second, a reduced Start Field (SF) order is implemented utilizing a Set Attribute (SA) order with a second byte which now contains a field attribute character. This enables the Start Field order to be a single byte for those consecutive fields in a data stream which have the same attributes.

Third, a reduced repeat to address (RA) order is implemented with utilizing a Set Attribute (SA) order which designates the character to be repeated. This avoids continually indicating what character should be repeated when it can be designated once in a data stream. Then, once indicated, the character may then be repeated in each of the unprotected addresses for the entire data stream as designated by an RA order which is shorter in length.

Fourth, a Modify Existing Format has been implemented which provides a means of modifying a format load that is currently in the format storage of the outboard device without having the host application program resend the entire format when only a small portion of the format needs to be modified. Specifically, the Load Format Structured Field has been modified to add the modify existing format fields to modify specified portions of the Load Format Structured Field without having to retransmit the entire field.

Fifth, a modified Set Partition Characteristics structured field is used by the host application to selectively enable and disable the Local Format Storage feature. This enables a host application to selectively determine when to reset the Format Group rather than resetting the Format Group Selection automatically prior to being able to use a loaded format.

One advantage of the present invention is the elimination of data bytes in the 3270 transmission. This improves line utilization and hence reduces network costs.

Another advantage of the present invention is the enhancement to the Format Storage Architecture. This has further reduced the transmission traffic resulting from Load and Present Format 3270 Data Streams.

The foregoing and other features and advantages of the present invention will be apparent from the following more particular description of preferred embodiments of the invention, as illustrated in the accompanying drawings.

BRIEF DESCRIPTION OF THE DRAWINGS

FIG. 3 shows an example of an SBA order using 14-bit binary addressing;

FIG. 4 shows the 6-bit increment addressing used in the addressing scheme of the present invention for the SBA order;

FIG. 5 shows the 6-bit increment addressing used in the addressing scheme of the present invention for the EUA order;

FIG. 12 is an example data stream illustrating the implementation of the short RA order and corresponding SA order of the present invention;

BEST MODE FOR CARRYING OUT THE INVENTION

I. Introduction

Figure 1:
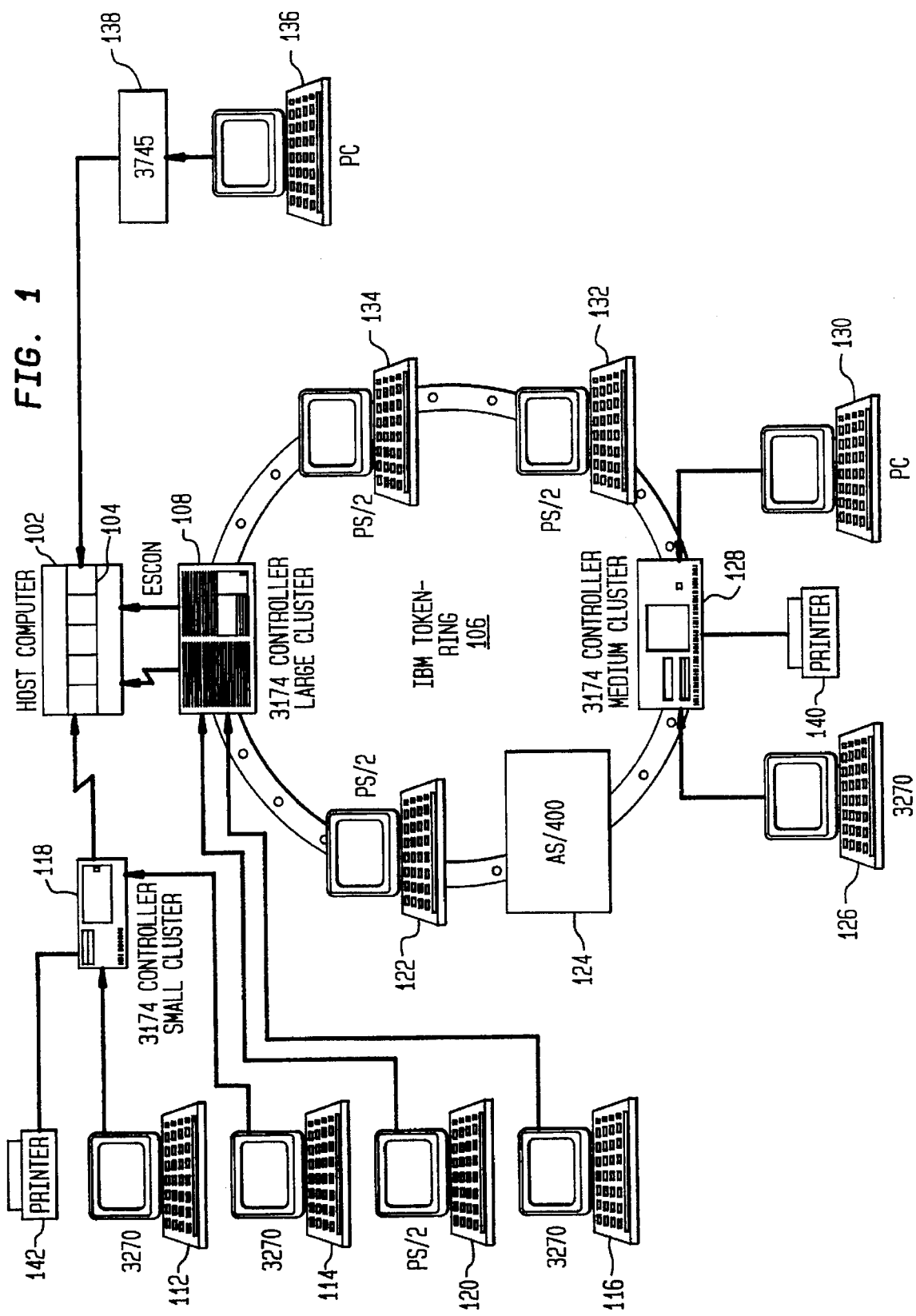
FIG. 1 shows a block diagram of the computer system in which the present invention is implemented.

FIG. 1 illustrates an exemplary system configuration wherein the preferred embodiment of the present invention is implemented. Referring to FIG. 1, a host computer 102 having a number of applications programs 104 interfaces with various terminals, workstations, personal computers (PC), etc., either directly or through the use of concentrators and controllers.

Host computer 102 is connected to a large cluster of systems including an IBM token ring network 106 via a 3174 establishment controller 108. IBM token ring network 106 comprises personal computers 122, 132, 134, as well as network node 124. Also included in the large cluster are personal computer 120 and 3270 workstation 116.

Coupled to IBM token ring network 106 is a 3174 establishment controller 128. Controller 128 couples IBM token ring network 106 with a medium cluster of devices and systems. This medium cluster includes 3270 terminal 126, personal computer 130, and printer 140.

Host computer 102 is also coupled to individual systems, including personal computer 136 via a 3745 data coupler 138. Host computer 102 is also coupled with a small cluster of 3270 terminals 112, 114 and a printer 142 via a 3174 establishment controller 118.

The 3270 data stream consists of information transmitted between the 3174 establishment controllers 118, 108, 128 and the IBM host computer system 102. The 3270 data stream is also used to transmit data and information between the host computer system 102 and PCs 102, 132, 134. A specific system environment is described above. However, as would be apparent to one skilled in the relevant art the applications programs 104, referred to as primary logical units (PLU(s)) may be any type of application program which initiates 3270 data stream architecture communications. It should also be noted that the PLU(s) may reside on any type of computer system platform. Likewise, the receiver computer systems, such as the 3174 establishment controllers and PCs, referred to as secondary logical units (SLUs), may be any type of system which can process 3270 data stream communications. The SLU(s) may also reside on any type of computer system platform.

When a PLU is transmitting information to one or more SLUs (referred to as an outbound communication), the 3270 data stream can consist of commands, structured fields, orders, application data, and control command parameters. When the SLUs transmit information to a PLU (referred to as an inbound communication), the 3270 data stream can consist of attention identification (AID) bytes, orders, application data, sense information and control information. The commands, structured fields, and orders are discussed briefly below.

The 3270 data stream uses two types of commands: data transfer commands and control commands. Data transfer commands are issued to initiate operations such as the total or partial writing, reading and erasing of data in a selected SLU character buffer. Control commands initiate controller and/or device operations not involved with data transfer (except for status information).

Structured fields enable the SLUs to decompose a message into its component fields without having to examine each byte. Structured field functions (data transfer or control) are used for such operations as loading a programmed symbol set and querying a device as to its characteristics (for example, character buffer capacity). Orders can be included in write data streams either alone or intermixed with display and print data.

Buffer control orders are interpreted and executed as they are received by the SLUs. They are used to position, define, modify, and decide attributes on a field and character basis and to format data being written to a display character buffer. They can erase selected unprotected in the buffer and reposition the cursor. The outbound data stream can contain orders directing the formatting of a display device buffer or of a printer operation.

Data, command, and orders which are transmitted between a PLU and SLU are in the form of interface codes. Two different codes are used: Extended Binary-Coded Decimal Interchange Code (EBCDIC) and American National Standard Code for Information Interchange (ASCII) both of which are well known in the relevant art. EBCDIC and ASCII explicitly define an information interchange code and implicitly specify unique character sets.

The 3174 establishment controllers are the basic component of the IBM 3270 Information Display System. The 3174 establishment controllers are a type of SLU which connect display stations, workstations, printers, personal computers, etc. to the host processor 102. FIG. 1 illustrates just one example configuration. The 3174 establishment controllers enable end-user terminals to gain access to multiple applications via multiple protocols from multiple IBM and non-IBM host computer systems. The 3174 establishment controllers also provide host (PLU) access to a wide variety of devices and Logical Unit (LU) types. Thus, the 3174 establishment controller is a communication and connectivity processor.

The 3270 terminals 112, 114, 116, 126 and ASCII devices (such as printer 140) which may be attached to the 3174 establishment controller are referred to as either Control Unit Terminals (CUT) or Distributed Functional Terminals (DFT). CUTs are display stations and printers that require the 3174 establishment controller to interpret the data stream and execute functions on their behalf, i.e., perform the SLU functions. DFTs are terminals that do not require the 3174 establishment controllers to interpret the data stream and execute required functions on their behalf. Rather, the 3174 establishment controller provides communication services to the DFT and then receives and transmits transmissions with the host computer 102 on behalf of the DFTs. 3174 establishment controllers do not perform as an SLU for the DFTs. The DFTs can interpret the data stream because of a control program which is sent to the DFTs from the 3174 establishment controllers in a downstream load or that is present in the DFTs themselves. Referring to FIG. 1, examples of DFTs are PS/2 122, 134, 132, 120.

In addition, there are ASCII devices connected to the 3174 establishment controller. ASCII devices are display stations or printers that are typically attached to the 3174 through a asynchronous emulation adapters (AEA).

The present invention is an improvement on the 3270 data stream architecture which improves the efficiency of the data transmissions between a PLU and SLU. Specifically 5 areas are addressed: (1) buffer control order addressing, (2) start field order, (3) repeat to address order, (4) modification of existing formats, and (5) resetting of a format group. Each of these are discussed below in detail.

In this Specification, for ease of description, the 3270 data stream will be described with reference to a sender device and a receiver device. In particular circumstances wherein the data stream is transmitted by a particular type of device (PLU or SLU), then such will be noted.

II. Buffer Control Order Address Byte Modification

The 3270 data stream architecture implements orders which may be included in Write, Erase/Write, or Erase/Write Alternate command data streams. These drivers, which are well known in the art, may be transmitted from the PLU either alone or intermixed with display or print data. There are two types of orders available in the 3270 data stream architecture: printout format orders, and buffer control orders.

Printout format orders are initially stored in the SLU as data, and are subsequently executed only during a print operation. Buffer control orders are executed as they are received in the Write data stream by the SLU and are not stored in a buffer.

First, the buffer control orders of the present invention are discussed. Then, the means by which the PLU determines whether the SLU has the capability of supporting the buffer control orders of the present invention are described.

A. Buffer Control Orders

There are a total of seven buffer control orders which are provided in the 3270 data stream architecture. These orders are used to position, defineand format data being written into the buffer. They are also used to erase selected unprotected data in the buffer and to reposition the cursor. These buffer control orders are shown in Table 1.

TABLE 1

Buffer Control Orders Utilized in Present 3270 Data Stream Architecture

| | Byte 1 (Order Code) (Hex) | | | | |
|---|---|---|---|---|---|
| Order | EBCDIC | ASCII | Byte 2 | Byte 3 | Byte 4 |
| Start Field (SF) | 1D | 1D | Attribute character | | |
| Set Buffer Address (SBA) | 11 | 11 | 1st address byte | 2nd address byte | |
| Insert Cursor (IC) | 13 | 13 | | | |
| Program Tab (PT) | 05 | 09 | | | |
| Repeat to Address (RA) | 3C | 14 | 1st address byte | 2nd address byte | Character to be repeated |
| Erase Unprotected to Address (EUA) | 12 | 12 | 1st address byte | 2nd address byte | |
| Graphic Escape (GE) | 08 | 08 | character code | | |

Presently, the outbound data streams from the PLU normally use either 12-bit or 14-bit buffer addressing or a combination of these, depending upon the number of bytes which are transferred. Inbound data streams to the PLU use 12-bit buffer addressing. For the 12-bit and 14-bit buffer addresses, the two high order bits of the first address byte, bits 0 and 1, following the SBA, RA, or EUA orders are used to designate what addressing is to be used with the order. These 2 bits are referred to as flag bits. Referring to Table 1, byte 2 of the SBA, RA, and EUA orders is the first address byte and contains these flag bits. The flag bits have the values shown below in Table 2, which designate the type of addressing scheme which follows these two high order bits. The addressing is contained in a buffer address field which contains the first and second address bytes (bytes 2 and 3 in Table 1).

TABLE 2

Buffer Control Order Address Byte Interpretation in Present 3270 Data Stream Architecture

| Bit 0 | Bit 1 | Definition |
|---|---|---|
| 0 | 0 | 14-bit binary address |
| 0 | 1 | 12-bit code address |
| 1 | 0 | Reserved |
| 1 | 1 | 12-bit code address |

Referring to Table 2, when the two high order bits of the first address byte have a value of "00," this indicates a 14-bit binary address follows. Thus, the next 14 bits contain a buffer address in binary form. These 14 bits include the remaining six bits of the first address byte (byte 2) and the eight bits of the second address byte (byte 3). Since this is a binary representation, address translation is not necessary. When the two high order bits of the first address byte are a "01" or a "11," then a 12-bit code address follows. Decoding this address is discussed further below. Lastly, the "10" combination for the two high order bits of the first address byte presently are reserved in the 3270 data stream architecture.

Existing applications using the 3270 data stream architecture do not support a "10" bit combination for the flag bits. Receipt of a buffer address beginning with the flag bits set to a "10" causes a negative response to be generated.

The set buffer address (SBA) order is a three-byte order which specifies a new buffer address from which write operations are to start or continue. SBA orders can be used to write data into various areas of the buffer. An SBA order can also precede another order in the data stream to specify such things as the starting address for the subsequent order, the address at which an attribute byte (see byte 2 in Table 1) is to be stored or modified by certain other orders, or the address at which the cursor is to be repositioned by other orders. If the SBA order specifies an invalid address, the write operation is terminated.

The repeat to address (RA) order is a four-byte or five-byte order which stores a specified alphanumeric or null character in all buffer locations, starting at the current buffer address (CBA) and ending at, but not including, the identified stop address. This stop address, and the character to be repeated, are identified by the three bytes (bytes 2–4 of Table 1) immediately following the RA order in the write data stream. The repeat to address data stream is extracted from Table 1 and shown below in Table 3 for clarity.

TABLE 3

RA Order Data Stream Utilized in
Present 3270 Data Stream Architecture

| Byte | Content |
|---|---|
| 1 | RA order |
| 2, 3 | Stop address |
| 4 | Character to be repeated |
| 4, 5 | Graphical Escape (GE) order followed by another character |

Thus, referring to Table 3, the first and second address bytes (bytes 2 and 3) contain the stop address. The fourth byte, which in Tables 1 and 3 is shown to be the character to be repeated, is always the third byte (byte 4) following the RA order. Note that under certain conditions, there is a fifth byte. This occurs when the fourth byte in an RA order is a graphic escape (GE) order. The fifth byte is then used to get an additional code page for character generation. If an invalid stop address is specified, the Write operation is terminated without storing the character and an error status is generated.

The erase unprotected to address (EUA) order is a three-byte order which inserts nulls in all unprotected buffer character locations, starting at the current buffer address and ending at, but not including, the specified stop address. This stop address is specified by two address bytes immediately following the EUA order in the Write data string. Thus, referring to Table 1, the first and second address bytes (bytes 2 and 3) of the EUA order contain the stop address. If an invalid address is specified, the write operation is terminated, and an error status is generated.

Each time an SBA, RA, or EUA order specifies a new address (for its particular operation), the entire three or four byte order is transmitted with the new buffer address contained in the first and second address bytes (bytes 2 and 3 in Table 1).

It has been determined that a large number of SBA, RA, and EUA orders specify a new buffer address which is less than 64 bytes from the current write location or current buffer address (CBA). Thus, the address which is contained in the first and second address bytes of the SBA, RA, and EUA orders shown in Table 1 contain either a 14-bit binary or a 12-bit code address which is less than 64 bytes from the present write location. In the preferred embodiment of the present invention, the addressing scheme has been modified to take advantage of this condition and reduce the number of bytes which are transferred with the SBA, RA, and EUA orders.

This modification has to be compatible with existing applications which are presently using the 3270 data stream architecture. As discussed above with reference to Table 1, if a secondary logic unit (SLU) receives an SBA order wherein the first two high-order bits of byte 2 are a "10," the SLU will generate a negative response. Thus, the present invention uses this combination of high-order bits to designate a new addressing scheme, and uses it only with SLUs which are configured to interpret this new addressing scheme. This addressing technique is the same for each of the three orders of the 3270 data stream architecture that use addressing (RA, SBA, EUA). Referring to Table 4, the "10" combination for the high-order bits of the first address byte are shown to represent a 6-bit increment in the present invention.

TABLE 4

Buffer Control Order Address Byte
Interpretation in the 3270 Data Stream
Architecture of Present Invention

| Bit 0 | Bit 1 | Definition |
|---|---|---|
| 0 | 0 | 14-bit binary address |
| 0 | 1 | 12-bit code address |
| 1 | 0 | 6-bit increment |
| 1 | 1 | 12-bit code address |

Thus, instead of the SBA, RA, and EUA orders having a 2 byte address, they may now contain a one byte increment. This one byte savings in each of the SBA, RA, and EUA orders results in significant increases in transmission efficiency.

The present invention can use the single byte increment when the new address is 64 bytes or less from the current write address. Alternatively, when the new address is greater than 64 bytes from the present address, the conventional two byte address scheme must be used.

Referring to Table 5, examples of SBA orders using the address byte modification of the present invention is illustrated. In these examples, all address are linear. When the linear addresses are assigned locations in a two-dimensional screen, the address is shown as a row/column. Thus, given a screen size of 80 columns, a linear address of 81 is assigned the screen address of row 2, column 1.

TABLE 5

SBA Address Byte Modification Examples
Illustrating the Buffer Control Order Address Byte
Modification of the Present Invention

| Byte 1 (Order) | Byte 1 (Addr. 1) | Byte 2 (Addr. 2) | Interpretation |
|---|---|---|---|
| 11 | C1 | 40 | 12-bit address row 1 col 65 |
| 11 | 40 | 40 | 12-bit address row 1 col 1 |
| 11 | 00 | 50 | 14-bit address row 2 col 1 |
| 11 | 91 | | 6-bit increment value of 17 |

Figure 2:
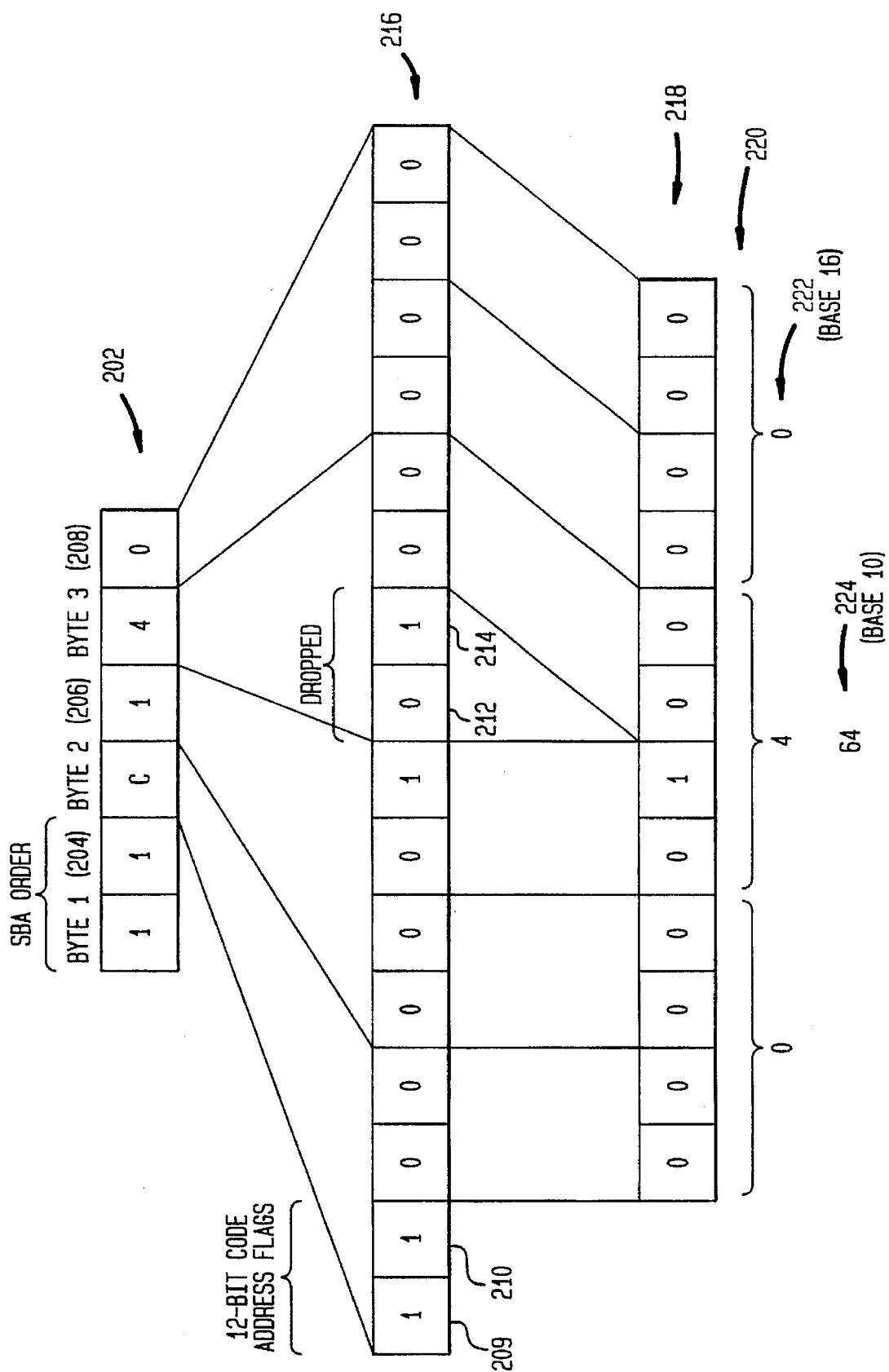
FIG. 2 shows an example of an SBA order using 12-bit code addressing.

Referring to the first example in Table 5 and FIG. 2, an SBA order 202 having bytes X'11C140' is given. The first byte 204 has a value of "11." This indicates that this is an SBA order (see Table 1). The second byte 206 is the first address byte and the third byte 208 is the second address byte. The decoding of the bit sequence 216 of address bytes 206, 208 is discussed below.

The two first order bits 209, 210 of first address byte 206 are a "11." These flags indicate that this is a 12 bit code address (see Table 4). When decoding a 12 bit code address, the two first order bits 212, 214 of byte 208 are not considered. The remaining bits 218 are then decoded in a sequential manner as indicated in FIG. 2. Thus, the remaining six bits of byte 206 and the remaining six bits of byte 208 are combined to result in the hex value 222 of X'040'. This is a value 224 of 64 in base 10. An address value of 0 is position 1 or row 1, column 1 in the buffer. Thus, the address value of 64 is position 65, or row 1, column 65.

Referring to the second example in Table 5, an SBA order having the bytes X'114040' is given. The first byte has a value of "11." This indicates that this is an SBA order (see Table 1). The second byte is the first address byte and the third byte is the second address byte. The decoding of the bit sequence of the first and second address bytes are performed in a similar manner to that used to decode the SBA order of the first example.

The two first order bits of the first address byte are a "01." This indicates that this is a 12-bit code address (see Table 4). When decoding a 12-bit code address, the two first order bits of the second address byte are not considered. The remaining bits are then decoded in a sequential manner. Thus, the remaining six bits of the first address byte and the remaining six bits of the second address byte are combined to result in the hex value of X'000'. This is a value of 00 in base 10, which results in the row 1, column 1.

Referring to the third example in Table 5 and FIG. 3, an SBA order having the bytes X'110050' is given. The first byte 304 has a value of "11." This indicates that this is an SBA order (see Table 1). The second byte 306 is the first address byte and the third byte 308 is the second address byte. The decoding of the bit sequence 316 of address bytes 306, 308 is discussed below.

The two first order bits 309, 310 of first address byte 306 are a "00." This indicates that this is a 14-bit binary address (see Table 4). The remaining six bits of byte 306 and the eight bits of byte 308 are combined to result in the hex value 320 of X'0050'. This is a value 322 of 80 in base 10. For an 80 column screen, an address of 80 is position 81, or row 2, column 1.

Referring to the fourth example of Table 5 and FIG. 4, an SBA order of the present invention is given. In this example, the SBA order has the bytes: X'1191'. As shown in Table 5 and FIG. 4, there are only two bytes required when utilizing the present invention. The first byte indicates that this is the SBA order. The second byte 406 is the only address byte required. The first two bits 408, 410 of the address byte 406 are a "10." This indicates that this is a 6-bit increment SBA order (see Table 4).

The remaining six bits of address byte 406 are a 6-bit increment address 414, which has a hex value 416 of X'11'. This is a value 418 of 17 in base 10. From a CBA of 0, this translates into row 1, column 17. To achieve this same 17-byte increment using the existing 3270 data stream architecture would require the addition of a second address byte, byte 3, as illustrated in the prior 3 examples.

Referring to Table 6, examples of EUA orders using the address byte modification of the present invention are illustrated. The examples in Table 6 are the same as the examples shown in Table 5 in relation to SBA orders. The difference, however, is that the value of byte 1 is X'12' to indicate that this is an EUA order rather than an SBA order (see Table 1).

In the present invention, when the stop address is 64 bytes or less from the current buffer address (CBA), the EUA order may contain a single address byte. Thus, the EUA order will be no more than two bytes in length under these circumstances. This is shown in the fourth example in Table 6 and FIG. 5. There, when the EUA order 502 is sent to insert nulls in all unprotected buffer character locations starting at the CBA of 0 and ending at an address which is 17 locations after the CBA (row 1, column 17), the EUA order 502 contains a single-byte increment rather than the standard 2-byte address such as those illustrated in the first three lines of Table 6.

TABLE 6

EUA Address Byte Modification Examples Illustrating the Buffer Control Order Address Byte Modification of the Present Invention

| Order | Byte 1 | Byte 2 | Interpretation |
|-------|--------|--------|----------------|
| 12 | C1 | 40 | 12-bit address erase to row 1 col 65 |
| 12 | 40 | 40 | 12-bit address erase to row 1 col 1 |
| 12 | 00 | 50 | 14-bit address erase to row 2 col 1 |
| 12 | 91 |    | 6-bit increment erase to row 1 col 17 (17 locations) |

Referring to the fourth example of Table 6 and FIG. 5, an EUA order 502 is given. In this example, the EUA order has bytes: X'1291'. As shown in Table 6, there are only two bytes required when utilizing the present invention when the EUA order increments 64 or less locations from the CRA. The first byte 504 contains the value X'12'. This indicates that this is the EUA order. The second byte 506 is the only address byte required. Address byte 506 contains the value X'91'. Referring to bit stream 512, the first two bits 508, 510 of address byte 506 are a "10." This indicates that this is a 6-bit increment EUA order (see Table 4).

The remaining six bits of address byte 506 are a 6-bit increment address 514 which has a base 10 value 516 of 17. From a CBA of 0, this translates into row 1 column 17. Thus, this EUA order inserts nulls in all unprotected character locations from buffer address 0 to buffer address 17 with a single address byte. To achieve this same 17-byte increment using the existing 3270 data stream architecture would require the addition of a second address byte, byte 3, as illustrated in the prior 3 examples.

Referring to Table 7, examples of RA orders using the address byte modification of the present invention are illustrated. In these examples, the first byte has a hex value of X'3C' to indicate that the order is a RA order (see Table 1).

TABLE 7

RA Order Examples Illustrating the Buffer Control Order Address Byte Modification of the Present Invention

| Order | Byte 1 | Byte 2 | Byte 3 | Byte 4 | Interpretation |
|-------|--------|--------|--------|--------|----------------|
| 3C | C1 | 40 | C1 |    | 12-bit address repeat A to row 1 col 65 |
| 3C | 40 | 40 | C1 |    | 12-bit address repeat A to row 1 col 1 |
| 3C | 00 | 50 | C1 |    | 14-bit address repeat A to row 2 col 1 |
| 3C | 00 | 50 | 08 | 41 | 14-bit address repeat underscore A to row 2 col 1 |
| 3C | 91 | C1 |    |    | 6-bit increment repeat A for 17 locations |
| 3C | 91 | 08 | 41 |    | 6-bit increment repeat underscore A for 17 locations |

Referring to the fourth example of Table 7, an RA order is given which has the bytes: X'91C1'. As shown in Table 7, there are only two bytes required utilizing the present invention when the RA order address is 64 or less buffer locations. The first byte contains the value X'3C'. This indicates that this is the RA order. The second byte is the only address byte required. This address byte contains the value X'91'. The first two bits of the address byte are a "10," indicating that this is a 6-bit increment RA order (see Table 4).

The remaining six bits of address byte 506 are a 6-bit increment address which has a value of 17. From a CBA of 0, this translates into row 1, column 17. Thus, this RA order inserts the alphanumeric "A" in all locations from buffer address 0 to buffer address 17 with a single address byte. To achieve this same 17-byte increment using the existing 3270 data stream architecture would require the addition of a second address byte, byte 3, as illustrated in the first three examples shown in Table 7.

B. Determination of SLU Capability

The PLU generally requires prior knowledge of the receiver's (SLU's) functional capability before sending any information to it. This information is solicited by the sender system (typically the host computer system 102) by means of a query structured field. The query structured field requests the receiver system to transmit information regarding its functional capability and the parameters associated with that function. The read partition query provides the mechanism for a PLU application program to inquire as to the color, highlighting, useable area, reply modes, and symbol-set characteristics of a terminal. The SLU responds with inbound structured fields in reply to the solicitation from the PLU application program. These replies are referred to as query replies.

In response to any useable area read partition query, the SLU responds with a Useable Area Query Reply. As a general rule, the PLU transmits the read partition query only once, when the terminal is initiated. This is because the useable area query reply contains physical characteristics which do not change during the operation of the, device.

This query reply indicates the various physical characteristics, of the devicesuch as size and characteristics of the screen or page of the addressed terminal. In addition to these characteristics, the useable area query reply also specifies the addressing modes that the terminal is capable of supporting.

The Useable Area Query Reply was chosen as the medium to transfer this information since the PLU application program requests that the terminal send its physical characteristics only once upon initiation.

Table 8 below illustrates the format of the useable area query reply presently used in the 3270 data stream architecture. The addressing modes supported by the SLU are indicated by byte 4, bits 4–7, wherein a X'1' indicates that the SLU supports 12-bit and 14-bit addressing, a X'3' indicates that the SLU supports 12-bit, 14-bit, and 16-bit addressing, and a X'F' indicates that the SLU is unmapped (there is no explicit address).

TABLE 8

Useable Area Query Reply of the Present 3270 Data Stream Architecture

| Byte | Bit | Content | Content Description |
|------|-----|---------|---------------------|
| 0–1 | 0–7 | L | Length of this Structured field |
| 2 | 0–7 | X'81' | Query Reply |
| 3 | 0–7 | X'81' | Useable Area Query Reply |
| 4–26 | | | Rest of Structured Field |

In the preferred embodiment of the present invention, wherein the SLU now supports 6-bit addressing, bytes 0 through 3 of the useable area query reply structured field are modified such that the SLU indicates that it supports 6-bit addressing. This is illustrated in Table 9.

TABLE 9

Useable Area Query Reply Implemented in the 3270 Data System Architecture of the Present Invention

| Byte | Bit | Content | Content Description |
|------|-----|---------|---------------------|
| 0–1 | 0–7 | X'03' | Length of Self Defining Parameter |
| 2 | 0–7 | X'05' | Self Defining Parameter type |
| 3 | 0–7 | X'01' | Indicates support of 6-bit increment |

Since the Useable Area Query Reply presently used in the 3270 data stream architecture has no spares in which to implement the additional information, a Useable Area Query Reply self-defining parameter has been created to indicate support of the 6-bit increment addressing described above.

The self-defining parameter is a commonly-used means by which an architecture is modified. This self-defining parameter may be transmitted as part of the Useable Area Query Reply.

Since the useable area query reply structured field is sent once per initiation of an applicationadding information to this field does not increase transmission traffic. Although the PLU application can query for this information at any time, in practice, this is only done once during an application initiation.

III. Single Byte Start Field

In the existing 3270 data stream architecture, the Start Field (SF) order is used to create a field on the Presentation Space. Referring to Table 1 and FIG. 6, the SF order 602 is a 2 byte order. The first byte 604 contains an order code (X'1D'), indicating that the order is a Start Field order. The second byte 606 contains a field attribute character. The attribute character is an 8-bit character which designates the start of a field and assign characteristics to that field. Thus, the first byte 604 of SF order 602 essentially notifies the SLU that the next byte in the Write data stream is a field attribute character. The SLU then stores the next byte 602 at the CBA. As the field attribute character is storedthe SLU sets a control bit at that address. This control bit identifies the byte as an attribute character during subsequent program or device operations with the buffer data.

All display stations which use the 3270 data stream architecture may be programmed with formatted fields. The control character at the start of each of these fields contains the field attributes which are received in the second byte 606 of Start Field order 602. Attributes contained in this character apply to all data contained in the field. The field attribute character occupies the first character position of each display field in a formatted display. The corresponding character position on the display screen is always blank. The value assigned to each field of the attribute character 606 determines which specific characteristics are assigned to the associated display field. The attribute character 606 of Start Field order 602 is provided in Table 10.

TABLE 10

SF Order Field Attribute Character Bit Assignment

| EBCDIC Bit | Field Description |
|------------|-------------------|
| 0,1 | Value determined by contents of bits 2–7. Not significant. |
| 2 | 0 - Unprotected |
| | 1 - Protected |

TABLE 10-continued

SF Order Field Attribute Character Bit Assignment

| EBCDIC Bit | Field Description |
|---|---|
| 3 | 0 - Alphanumeric |
|   | 1 - Numeric (cause automatic upshift of Data Entry keyboard) |
|   | Note: Bits 2 and 3 equal to 1 causes an automatic skip. |
| 4,5 | 00 - Display/not selector light pen detectable. |
|   | 01 - Display/selector light pen detectable. |
|   | 10 - Intensified display/selector light pen detectable. |
|   | 11 - Nondisplay, nonprint, nondetectable. |
| 6 | Reserved |
| 7 | MDT identifies modified fields during Read Modified command operations. |
|   | 0 - Field has not been modified. |
|   | 1 - Field has been modified by the operator. Can also be set by program in data stream. |

Figure 6:
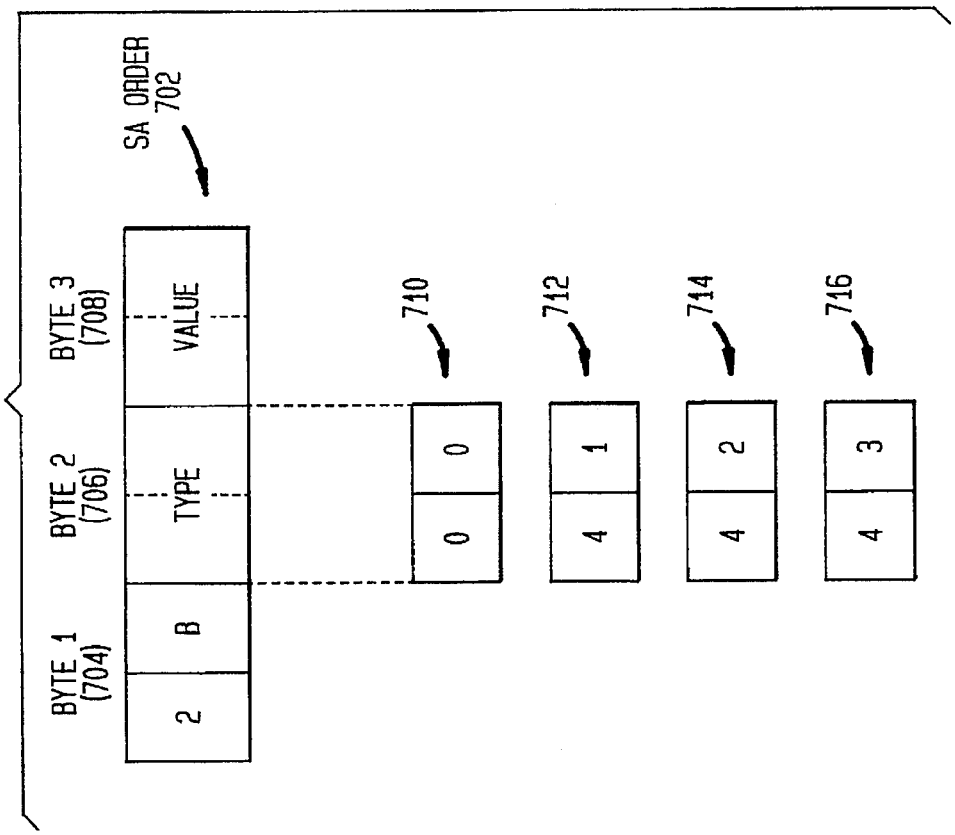
FIG. 6 shows a Start Field order containing a field attribute character.

Referring to Table 10 and bit stream 608 of FIG. 6, the field attribute character 606 sets the following characteristics in the associated display field. First, a protection value is set in bit 2 (610) indicating if the associated field is protected or unprotected. An operator cannot enter data into, or modify the contents of, a protected field. Input fields that require data from the operator must be unprotected.

Second, the type of data in the associated field is provided in bit 3 (612). This is a determination of whether the associated field is alphanumeric or numeric. In an unprotected input field, alphanumeric/numeric defines the type of data that an operator can enter into the field. This attribute has special meaning for protected fields, Data Entry keyboards, and the Numeric Lock feature.

Third, the display type of the associated field is specified in bits 4 and 5 (614). This is indicated by a nondisplay or display boolean. The data contained in the field is either not displayed, displayed at normal intensity, or displayed at high intensity.

Fourth, a light pen detection capability of the associated field is specified in bit 7 (616). This is given in a detectable/nondetectable boolean. Display data in a detectable field can be detected by the selector light pen. The detectable field must contain a designated character.

Upon entry of a character into the last character location of an unprotected data field, the cursor is repositioned according to the attribute character describing the next field. However, if the field attribute character 606 describing the next field defines the field as numeric and protected, the cursor automatically skips that field and is positioned to the next character location of the next unprotected field. Thus, when the protection field 610 and the data type field 612 are equal to "11" an automatic skip occurs.

In the preferred embodiment of the present invention, a Set Attribute (SA) order is used to change the attributes applicable to the character at the current buffer address (CBA) or to set these attribute types to their default values. These attributes include color, extended highlighting, and programmed symbols. Attributes which are set for the character at the CBA are applied to the current and subsequent characters in the data stream until another SA order is encountered or the attributes are reset by a Write-type command or a power-on reset. Color, extended highlighting, and programmed symbols attributes that are set at the character level override the same attributes that are set at the field level.

Figure 7:
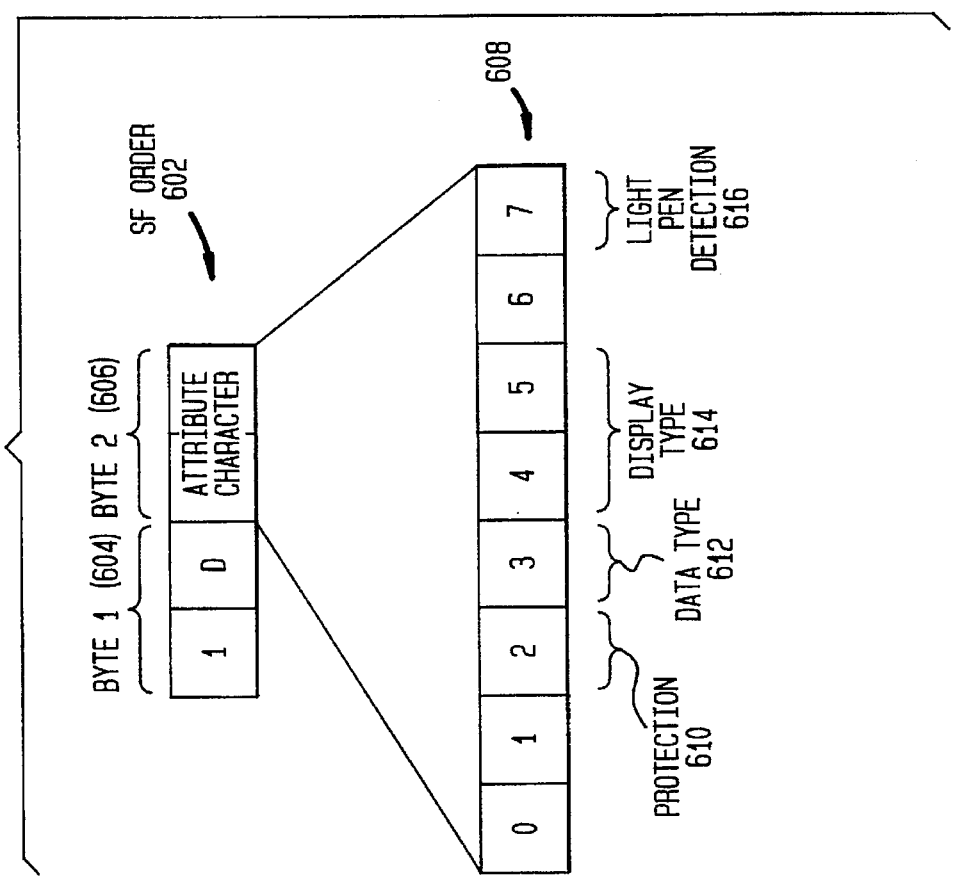
FIG. 7 shows a Set Attribute Order.

FIG. 7 illustrates a 3270 data stream architecture SA order. Referring to FIG. 7, SA order 702 is a 3 byte order. The first byte 704 of SA order 702 is always X'2B', indicating that this is the first byte of an SA order. This is referred to as a set attribute identification byte. The second byte 706 of SA order 702 is a type character. The type character 706 contains a value which indicates which of four attribute types specifiable in the SA order is assigned to the associated field (discussed below). The third byte 708 contains the value at which the type indicated in the second byte 706 is set at for the particular associated field. For each attribute type which is to be changed, a separate SA order must precede the character in the data stream.

Referring to Table 11 and FIG. 7, the attribute type code presently used in SA order byte 2 (706) are illustrated. The attribute type byte 706 may indicate that the attribute character should be reset by having a value 710 of X'00'. The attribute character type may have a value 712 of X'41', indicating that the extended highlighting of the associated field is to be set to the value provided in attribute type value byte 708. The attribute character type may have a value of X'42', indicating that the color of the associated field is to be set to the value provided in attribute type value byte 708. Lastly, the attribute character type may have a value of 716 X'42', indicating that the programmed symbols of the associated field is to be set to the value provided in attribute type value byte 708.

TABLE 11

Present 3270 Data Stream Architecture SA Order Attribute Type Codes

| Attribute Type | Code |
|---|---|
| Character Attribute Reset | X'00' |
| Extended Highlighting | X'41' |
| Color | X'42' |
| Programmed Symbols | X'43' |

The 3270 data stream architecture attribute code values which are included in the SA order third byte (708) are shown below in Table 12.

TABLE 12

Present 3270 Data Stream Architecture Valid Attribute Code Values for Attribute Types Supported by SA Order

| Type Code | Value | Result |
|---|---|---|
| X'00' | X'00' | This is the only valid setting for this attribute type. This type/value pair is used only with the SA order. All character attributes specifiable in the SA order are set to default value. |
| X'41' | X'00' | Default. |
|  | X'F1' | Blink |
|  | X'F2' | Reverse video |
|  | X'F4' | Underscore |
| X'42' | X'00' | Default. |
|  | X'F1' | Blue |
|  | X'F2' | Red |
|  | X'F3" | Pink |
|  | X'F4' | Green |
|  | X'F5' | Turquoise |
|  | X'F6' | Yellow |
|  | X'F7' | White for 3279, black for 3287, multicolor for triple-plane symbol. |
| X'43' | X'00' | Default. |

TABLE 12-continued

Present 3270 Data Stream Architecture Valid Attribute Code Values for Attribute Types Supported by SA Order

| Type Code | Value | Result |
|---|---|---|
| | X'40' to X'EF' | Valid range for symbol-set IDs assigned in the Load Programmed Symbols structured field. |
| | X'F1' | Symbol-set ID for the APL/Text symbol set in terminal storage ID X'01'. This attribute value can be used only in the SA order. If X'F1' is received in an SFE or MF order, an OP Chk or a negative response of X'1001' is returned. |

An SA order 702 is generated and inserted in the inbound data stream only when the attribute value 708 of an attribute type 706 that has been specified in the Set Reply Mode structured field changes. The assumption is made that the color, extended highlighting, and programmed symbols attribute types are all set to their default values at the beginning of the inbound transmission. The first SA order 702 generated will be for the first attribute not equal to its default value. The second SA order 702 generated will be for the second attribute not equal to its default value or to change an attribute set by a previous SA order. Attribute values that are unknown or cannot be maintained and returned inbound are rejected.

It was determined that a large number of fields created on a given presentation space had the same field attributes. That is, they were either all protected or unprotected, numeric or alphanumeric, etc. Thus, if the PLU application program establishes and stores attributes which were set at a previous SA order, and the desired field attributes are the same as those previously sent, then the SF order 602 does not need to contain the attribute character byte 606. Thus, when the next SF order 602 contains just the SF order designation byte 604 (X'1D'), then the characters which follow will be assigned the field attributes which were received in the previous SA order 702. Thus, the subsequent SF orders 602 are now single byte SF orders rather than two byte SF orders. This translates into significant savings in communications efficiency. This is implemented in the present invention as described below.

Figure 8:
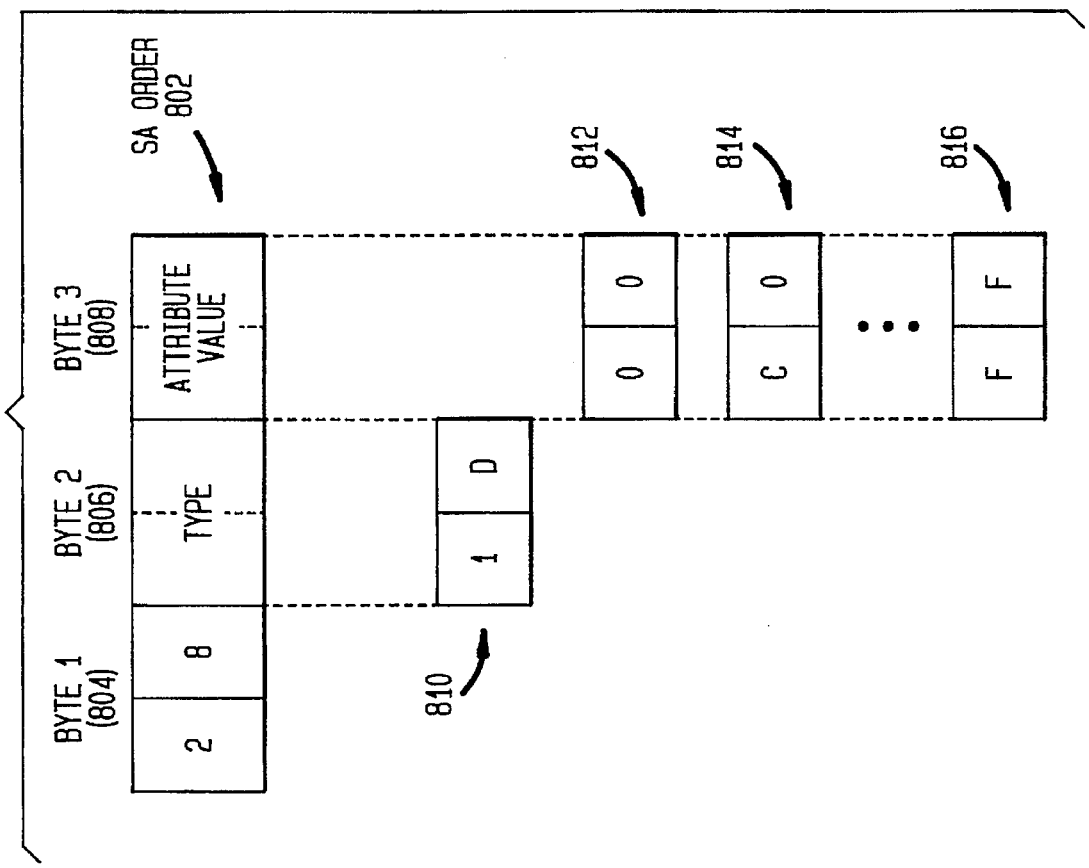
FIG. 8 shows an example of an Set Attribute order for setting a start field attribute in the present invention.

Referring to FIG. 8, Table 13, and Table 14, the SA order 802 of the present invention is illustrated. The first byte 804 is this SA order designation byte. Byte 804 always contains the value X'28'. The second byte 806 defines the type of attribute to be defined. Referring to Table 13, SA order 802 attribute type codes for the present invention are provided. Note that in addition to the attribute types reset, extended highlighting, color, and programmed symbols, there are two additional SA Order Attribute type codes which have been added. They are the start field attribute type code X'1D' and the repeat to address character type code X'3C'. The start field attribute code is discussed below. The RA character attribute is discussed in the following section. FIG. 8 illustrates the SA order 802 attribute type byte 806 as having a value 810 of X'1D'. This indicates that this SA order will define a Start Field Attribute.

TABLE 13

SA Order Attribute Type Codes in the Present Invention

| Attribute Type | Code |
|---|---|
| Character Attribute Reset | X'00' |
| Extended Highlighting | X'41' |
| Color | X'42' |
| Programmed Symbols | X'43' |
| Start Field Attribute | X'1D' |
| Repeat to Address Character | X'3C' |

Table 14 provides the valid attribute code values for attribute types supported by the SA order of the present invention. FIG. 8 also illustrates the possible values contained in SA order 802 attribute value byte 808 which are specifically associated with the type value 806 of X'1D'. Referring to Table 14 and FIG. 8, the default state 812 of X'00' indicates that the field attribute byte 806 of SF order 802 which is to be stored must be included in the subsequent SF order. The remaining values of byte 3 (808) may range from value 814 of X'C0' to value 816 of X'FF'. These values represents the same information that appears in Table 10, SF Order Field Attribute Character Bit Assignment.

Thus, SA order 802 of the present invention contains the field attribute which in the original 3270 data stream architecture was only part of an SF order (see Tables 1 and 10, and FIG. 6). The value 808 remains in effect until another SA order 802 with a Start Field attribute type code 806 equal to a value 810 of X'1D' changes it. A Write-type command resets the value to the default state.

TABLE 14

Value Attribute Code Values for Attribute Types Supported by SA Order of Present Invention

| Type Code | Value | Result |
|---|---|---|
| X'00' | X'00' | This is the only valid setting for this attribute type. This type/value pair is used only with the SA order. All character attributes specifiable in the SA order are set to default value. |
| X'41' | X'00' | Default. |
| | X'F1' | Blink |
| | X'F2' | Reverse video |
| | X'F4' | Underscore |
| X'42' | X'00' | Default. |
| | X'F1' | Blue |
| | X'F2' | Red |
| | X'F3" | Pink |
| | X'F4' | Green |
| | X'F5' | Turquoise |
| | X'F6' | Yellow |
| | X'F7' | White for 3279, black for 3287, multicolor for triple-plane symbol. |
| X'43' | X'00' | Default. |
| | X'40' to X'EF' | Valid range for symbol-set IDs assigned in the Load Programmed Symbols structured field. |
| | X'F1' | Symbol-set ID for the APL/Text symbol set in terminal storage ID X'01'. This attribute value can be used only in the SA order. If X'F1' is received in an SFE or MF order, an OP Chk or a negative response of X'1001' is returned. |

TABLE 14-continued

Value Attribute Code Values for Attribute
Types Supported by SA Order of Present Invention

| Type Code | Value | Result |
|---|---|---|
| X'1D' | X'00' | Require the field attribute byte in the SF sequence |
| | X'C0' to X'FF' | SF order field attribute character standard bit assignment |
| X'3C' | X'00' | Repeat null character. |
| | X'40' to X'FE' | Repeat the graphic character |
| | X'FF' | Require a character in the RA order sequence |

Figure 9:
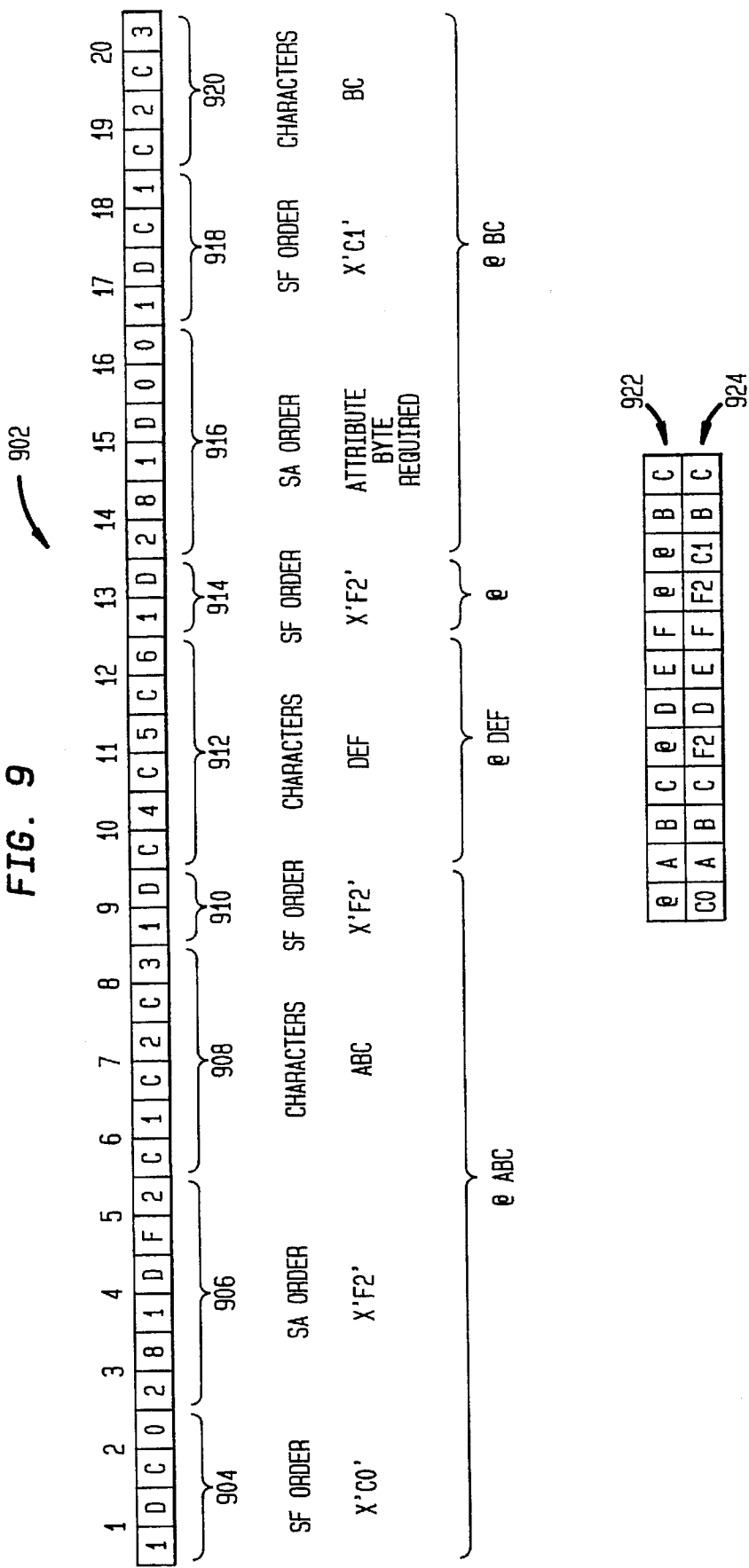
FIG. 9 shows an example data stream using the short SF order and corresponding SA order of the present invention.

An example data stream illustrating the single byte start field order of the present invention is given in FIG. 9. Referring to FIG. 9, data stream 902 is a representative portion of a larger 3270 data stream. Data stream 902 is parsed as follows.

Order 904, containing bytes 1–2, has the value X'1DC0'. This represents a Start Field order with an attribute value of X'C0'.

Order 906, containing bytes 3–5, has the value X'281DF2'. This is an SA order since byte 1, has the value X'28' (see FIG. 8). This is a set field attribute SA order since the second byte has an attribute type of X'1D'. This is a protected numeric field (see Table 10). This SA order has a Set Field Attribute value of X'F2'. Characters 908, containing bytes 6–8, have a value X'C1C2C3'. This is simply the alphanumeric characters X'ABC'. Thus, assuming that the @ symbol represents a field attribute, the resulting row of the presentation space would be @ABC. As shown in corresponding string 924, the attribute @ is X'C0'.

Order 910, containing byte 9, has the value X'1D'. This is interpreted as a Start Field setting the attribute of X'F2'. The value of X'F2' which has been set by SA order 906 is carried forward and stored with SF order 910.

Characters 912, containing bytes 10–12, have a value X'C4C5C6'. This represents alphanumeric characters (X'DEF'). Thus, the resulting row would now be @ABC@DEF. Thus, as shown in corresponding string 924, the alphanumeric characters X'DEF' have the same field attribute X'F2C'.

Order 914, containing byte 13, has the value X'1D'. This is again interpreted as a Start Field 602 setting the field attribute to X'F2'. The value of X'F2' from SA order 906 is continually carried forward until changed. Thus, as shown in corresponding string 924, the resulting row would now be @ABC@DEF@, wherein the last field attribute has the value X'F2'.

Order 916, containing bytes 14–16, has the value X'281D00'. This is an SA order with a Set Field Attribute requesting the attribute byte (see FIG. 8, reference 812).

Order 918, containing bytes 17–18, has the value X'1DC1'. This represents a Start Field order with an attribute value of X'C1'. Thus, the field attribute for all remaining fields is the combination of the field attributes X'F2' as modified by X'C1'.

Characters 920, containing bytes 19–20, have the value X'C2C3'. This represents the alphanumeric characters (X'BC'). Thus, the resulting row 922 would now be @ABC@DEF@ @BC, wherein the last field attribute is X'C1'.

This is an outbound function only. The SLU will indicate support of this function via a Useable Area Query Reply Self Defining Parameter. This is illustrated in Table 15.

TABLE 15

Useable Area Query Reply Self-Defining Parameter Indicating Support of the Short SF Order of the Present Invention

| Byte | Content Description | Comments |
|---|---|---|
| 0 | Structured Field Length | X'03' - Indicates the length of the SDP is 3 bytes |
| 1 | SDP Type | X'04' - Modified orders Supported |
| 2 | Types of modified orders | X'1D' - Indicates short Start Field order supported. |

Thus, the first byte (byte 0) of the Usable Area Self-Defining parameter indicates that it is 3 bytes in length. The second byte (byte 1) indicates that modified orders are supported. Modified orders are those, such as the single byte order described above, which have a reduced number of bytes. The third byte (byte 2) indicates that the above-described short SF order is supported. The same type value (X'1D") as that used in the SA order 802 is used for efficiency.

IV. Shorter Repeat to Address

As discussed above with respect to the buffer control order address byte modification, the repeat to address (RA) order is a four or five-byte order which stores a specified alphanumeric (e.g., blanks) or null character in all buffer locations, starting at the CBA and ending atbut not including, an identified stop address.

Figure 10:
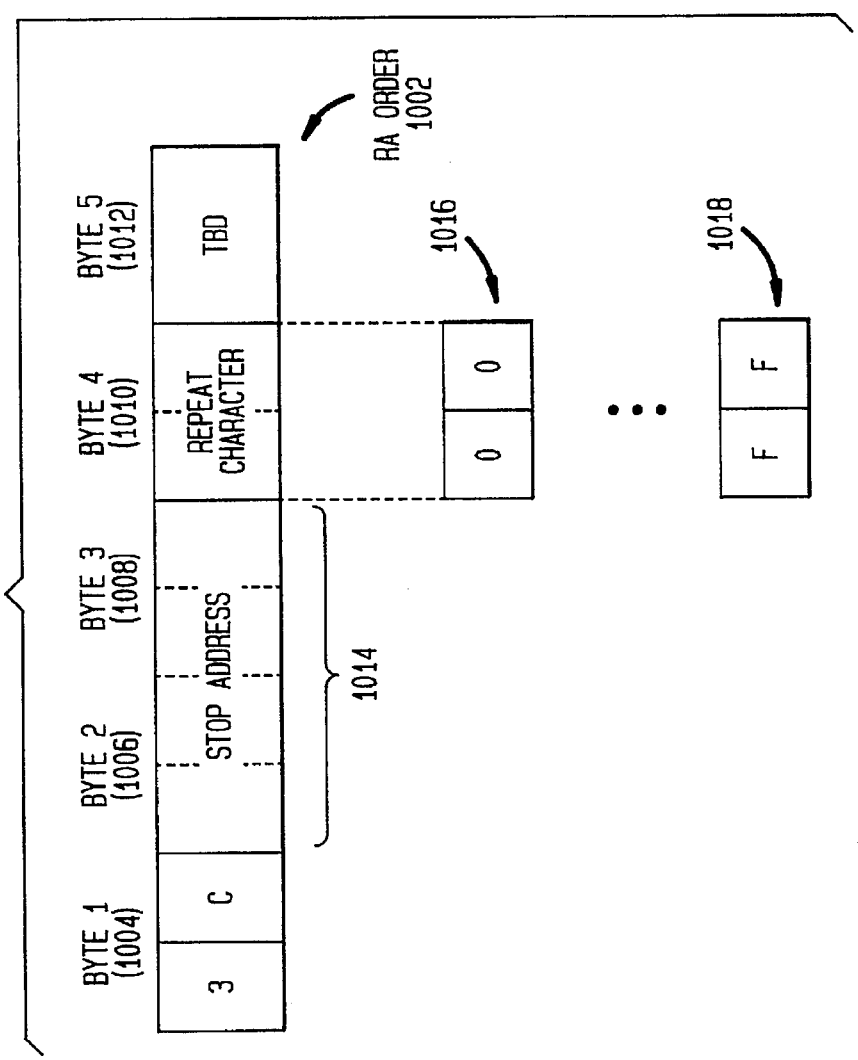
FIG. 10 shows a Repeat To Address order.

Referring to Table 3 and FIG. 10, the first byte 1004 of RA order 1002 has a constant value of X'3C'. This indicates that this is an RA order. The stop address 1014, to which the specified character is to be repeated, is contained in the first and second address bytes 1006, 1008.

The fourth byte 1010, contains the character to be repeated. This character is repeated in every presentation space address from the CBA to the stop address 1014. The repeat character is always the third byte following the RA order designation byte 1004. This repeat character may take on any alphanumeric value from the value 1016 of X'00' to the value 1018 of X'FF'.

Note that under certain conditions, there is a fifth byte 1012. This byte is included in RA order 1002 when the fourth byte of the RA order is a graphic escape order. The fifth byte 1012 is then used to get an additional code page for character generation. If an invalid stop address is specified, the Write operation is terminated without storing the character, and an error status is generated.

It has been found that the 3270 data stream transmission efficiency can be improved by not continually indicating what character should be repeated if it can be designated once at the beginning of a data stream. Then, once indicated, the character may then be repeated in subsequent RA orders.

Figure 11:
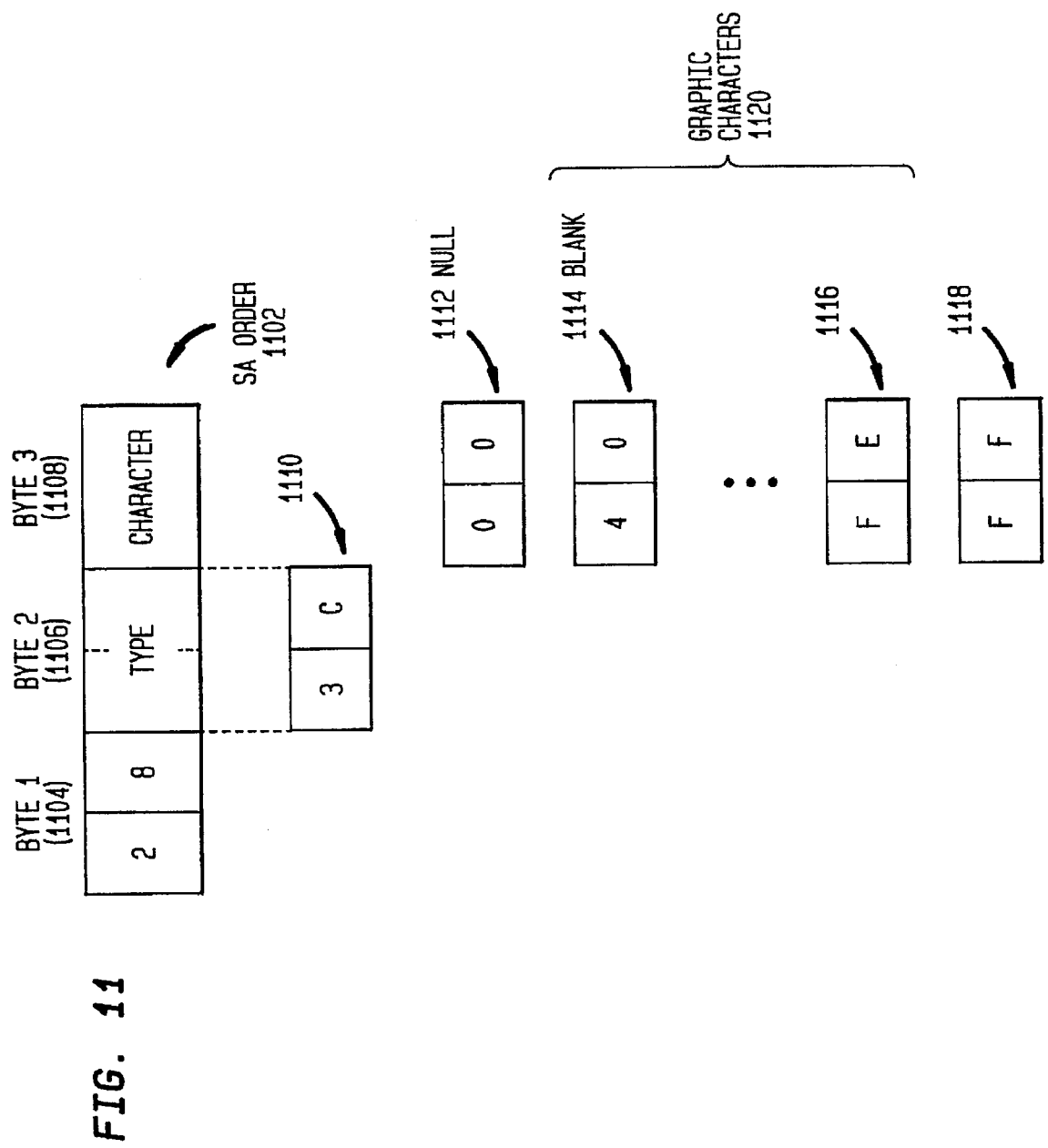
FIG. 11 shows as SA order of the present invention used for setting the repeat to address attribute.

This function is provided in the present invention by making a second modification to the set attribute (SA) order. The SA order has been modified to include the repeat character for subsequent RA orders. This modified SA order is illustrated in FIG. 11 and Table 13. By adding a type of X'3C' and an attribute type value equal to the repeat character, the SA order of the present invention may now be used to reduce the number of bytes transmitted to define the character that should be repeated following RA order 1002. Using the SA order in this manner enables each successive RA order 1002 to not include the character to be repeated if it is the same as that designated in the prior SA order.

FIG. 11 illustrates the SA order 1102 of the present invention which is used to designate a repeat to address character. Referring to FIG. 11, SA order 1102 has a first byte 1104 with a value of X'28'. This indicates that the following two bytes 1106, 1108 are part of an SA order. The second byte 1106 has the value X'3C' 1110. This indicates that this SA order 1102 is a repeat to address character SA order.

The third byte 1108 of SA order 1102 contains the character which is to repeated according to subsequent RA orders. This character byte 1108 may contain a null value 1112, of X'00' as well as any graphical character 1118 from a value 1114 of X'40' (a blank) to a value 1116 of X'FE'.

The third byte 1108 may also contain the value 1118 of X'FF', which is a default state. This value indicates that the character to be repeated must be included in the subsequent RA order.

The value provided in the third byte 1108 remains in effect until another SA order 1102 with a type 1106 having a value 1110 of X'3C'. The repeat character will be set to a default value with a Write-type command.

FIG. 12 shows a portion 1202 of a data stream which illustrates the use of the SA order of the present invention. The first order 1204 of bytes 1-4 contains the value X'3C0005D1'. The first byte has a value of X'3C', indicating that this is an RA order. The stop address in bytes 2-3 of this RA order has a value of X'0005'. This indicates that the designated repeat character should be repeated from the CBA to the fifth address location. The next byte, byte 4, is the repeat character byte, and has a value of X'D1'. This indicates that the character "J" is the repeat character. Thus, if the CBA is 1, the repeat character "J" is repeated from address location 1 up to but not including stop address 5. This portion of the presentation display is shown as string 1214 in FIG. 12.

The second order 1206 of bytes 5-7 contains the value X'283CE2'. The first byte, byte 5, has a value of X'28', indicating that this is an SA order. Since the next byte has a value of X'3C', this is a repeat to address character SA order. The last byte has a value of X'E2'. This indicates that the character "S" is the repeat character for subsequent RA orders. No character is written to the CBA.

The third order 1208 of bytes 8-10 contains the value X'3C000A'. The first byte 8 has a value of X'3C', indicating that this is an RA order. The stop address located in bytes 9 and 10 have a value of X'000A'. This indicates that the designated repeat character should be repeated from the CBA to the tenth address location. The RA order does not contain the remaining byte which typically represents the repeat character byte. The previous SA order 1206, however, designated the repeat character as an "S." SA order 1206 and the RA order 1208 result in the character "S" being repeated from the CBA to the tenth address. Since the CBA is 6, the repeat character "S" is repeated from address location up to but not including stop address 10. This portion of the presentation display is shown as string 1216 in FIG. 12.

Characters 1210, containing bytes 11-13, have the value X'C1C2C3'. This is a simple alphanumeric string of the characters "ABC." The resulting portion of the presentation space is shown as string 1218 in FIG. 12.

The fifth order 1212, containing bytes 14-16, has the value X'3C0010'. The first byte 14, has a value of X'3C', indicating that this is an RA order. The stop address in bytes 15 and 16 have a value of X'0010'. This indicates that the designated repeat character should be repeated from the CBA to the sixteenth address location. The RA order does not contain the remaining byte which typically represents the repeat character byte. The previous SA order 1206, however, designated the repeat character as an "S." The designated repeat character is not effected by the Writing of the alphanumeric characters "ABC" 1218 to the presentation space. The SA order 1206 and the RA order 1212 result in the character "S" being repeated from the CBA to the sixteenth address. Since the CBA is 14, the repeat character "S" is repeated from address location 14 up to but not including stop address 16. This portion of the presentation display is shown as string 1220 in FIG. 12.

Thus, the resulting presentation space display 1222 from this portion 1202 of the data stream is achieved using fewer bytes in the RA orders following the SA order in field 1206. this results in significant savings over the numerous character fields which are continually updated on a single display terminal.

This is an outbound function only. The SLU will indicate support of this function via an Useable Area Query Reply Self Defining Parameter as illustrated in Table 16.

TABLE 16

Useable Area Query Reply Self-Defining Parameter Indicating Support of the Short RA Order of the Present Invention

| Byte | Content Description | Comments |
|---|---|---|
| 0 | Structured Field Length | X'03' - Indicates the length of the SDP is 3 bytes. |
| 1 | SDP Type | X'04' - Modified orders Supported |
| 2 | Types of modified orders | X'3C' - Indicates Repeat To Address order supported |

Thus, the first byte of the Usable Area Self-Defining parameter indicates that it is 3 bytes in length. The second byte indicates that modified orders are supported. The third byte indicates that the above-described RA order is supported.

V. Modify Existing Format

There are a number of cases where the PLU application program has a format load in the format storage of the outboard device and would like to modify the format. In the 3270 data system architecture, the only way to modify the contents of a format is to resend the entire format, even if only a small portion of the format needs to be modified. This causes extra bytes to be transmitted across the network. The Modify Existing Format of the present invention provides a means of modifying a format that is currently loaded.

TABLE 17

Load Format Storage Structured Field in Present 3270 Data Stream Architecture

| Byte | Bit | Content Description | Comments |
|---|---|---|---|
| 0–1 | | Structured Field Length | The length of this structure |
| 2–3 | | Structured Field Type | Must be X'0F24' |
| 4 | 0,1 | B'11' | Reserved - Must be B'11' |
| | 2 | | Loacl Format Selection: |
| | | B'0' | Format can be selected only by the host. |
| | | B'1' | Format can be selected by the host or the operator. |
| | 3 | | Screen size for operator-selected format: |
| | | B'0' | Default screen size |
| | | B'1' | Alternate screen size |
| | 4–7 | B'0000' | Reserved - Must be zeros |
| 5 | | X'00' | |
| 6 | | | Operand |
| | | X'01' | Add Format |
| | | X'02' | Delete Format |
| | | X'03' | Delete Format Group |
| | | X'04' | Reset Format Storage |
| | | X'05' | Request Summary Status |
| | | X'06' | Request Group Status |
| 7–14 | | | Local name for operator-selected format |
| 15–30 | | | Format Group name |
| 31–46 | | | Format name |
| 47–n | | | Format data |

The Load Format Structured Field of the present invention is provided below in Table 18. The addition of Modify Existing Format field in bytes 47-n enables the 3270 Data Stream Architecture of the present invention to modify specified portions of the Load Format Structured Field without having to retransmit the entire field.

TABLE 18

Load Format Storage Structured Field of the Present Invention

| BYTE | CONTENT DESCRIPTION | Comments |
|---|---|---|
| 0–1 | Structured Field Length | The length of this structure |
| 2–3 | Structured Field Type | Must be X'0F24' |
| 4 | Flags | MUST BE SAME as loaded format being modified |
| 5 | Flags | MUST BE SAME as loaded format being modified |
| 6 | Operand | X'07' - INDICATES MODIFY FUNCTION |
| 7–14 | Local name for user selected formats | MUST BE SAME as loaded format being modified |
| 15–30 | Formate Group Name | MUST BE SAME as loaded format being modified |
| 31–46 | Format Name | MUST BE SAME as loaded format being modified |
| 47–n | MODDATA | Modify Existing Format data |

Figure 13:
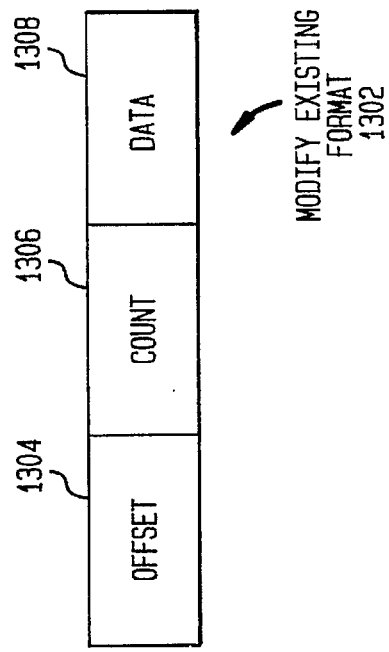
FIG. 13 shows the format of the Modify Existing Format of the present invention.

Referring to FIG. 13, the format of MODDATA 1302, which begins at byte 47, has three fields: (1) offset field 1304, (2) count field 1306, and (3) data field 1308. These fields may be repeated, providing multiple modified fields in a single load format storage structured field.

The offset field 1304 contains the number of locations from where the previous modification was completed. This point of comparison is referred to as the stop location. The initial or default value for the stop location is 0. The offset field 1304 may contain either one or two bytes. If the high order bit of the first offset byte is set to a "1"then the offset field 1304 is one byte in length. A one byte offset allows increments up to 128, with X'0' indicates 128 and an offset of X'1' to X'F' indicating 1–127 offset. If the high order bit is set to a "0", then offset field 1304 contains two bytes, indicating an offset of up to 32K locations. The location from which the modification beginsreferred to as the start location, is the stop location plus the offset.

The count field 1306 indicates the number of bytes that follow. The count field 1306 always is one byte in length. Thus, the Modify Existing Format can have up to 256 bytes, with a count of X'00' indicating a count of 256 bytes.

The data field 1308 is the modified data of the length indicated in the count field.

Figure 14:
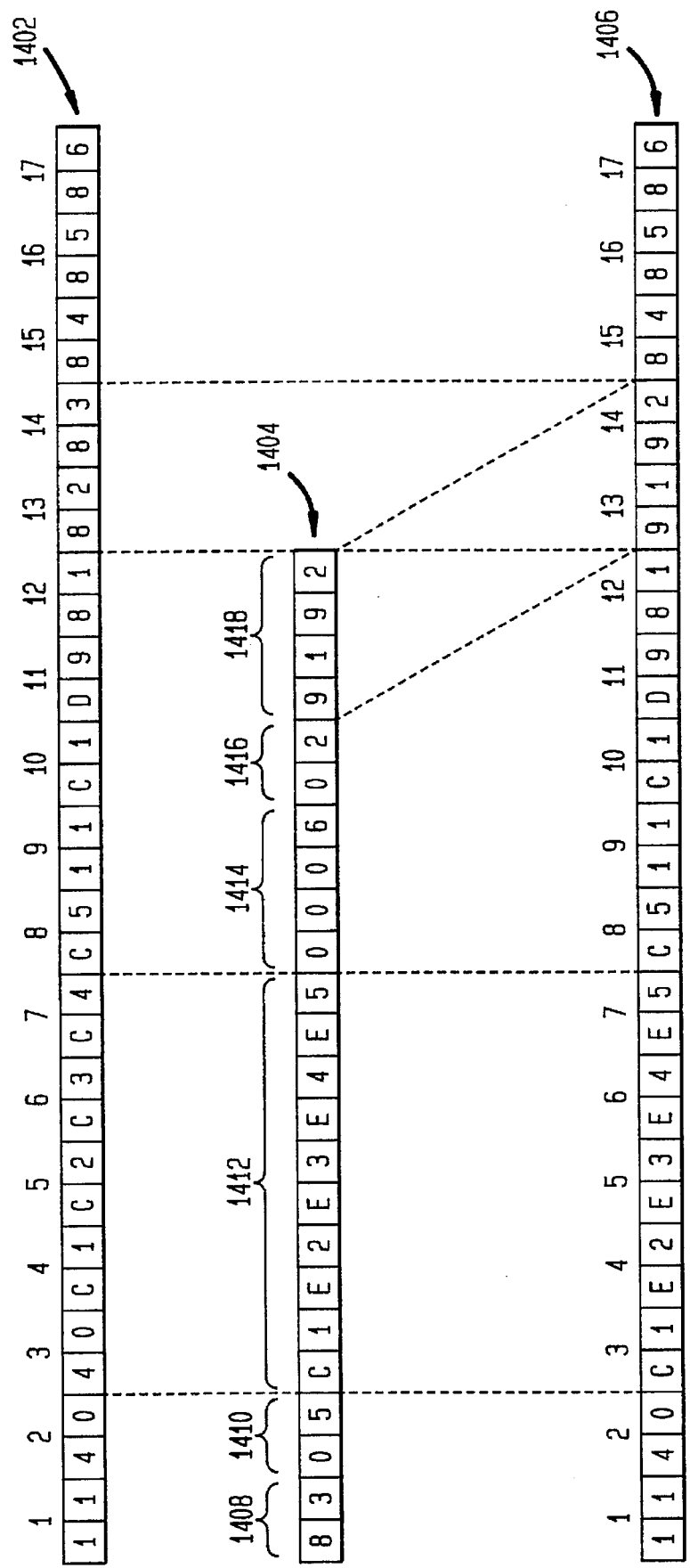
FIG. 14 is an example data stream illustrating the implementation of the Modify Existing Format of the present invention.

FIG. 14 illustrates an example implementation of the Modify Existing Format of the present invention. If a particular load format 1406 is desired and a load format 1402 is presently existing, then the data modification of the present invention may be used to change the existing format 1402 to the desired loaded format 1406. The implementation of that data modification, Modify Existing Format 1404, is discussed below.

Comparing the desired load format 1406 with the existing load format 1402 reveals those bytes which are to be changed. They are bytes 3–7 and 13–14. Rather than resend the entire load format storage structure field, which in practice is considerably larger than this examplethe Modify Existing Format 1404 is implemented. As shown in FIG. 14, Modify Existing Format 1404 has approximately 30% less bytes that the load format which is being modified.

Referring to FIG. 14, the first byte of Modify Existing Format 1404 has the value X'83'. Since the first bit is a "1", this is a single bit offset. Thus, offset field 1408 is X'03'. This indicates that an offset of 3 bytes is desired. Given that the stop location is initialized to 0, the start location for the first modification is first start location=0+3=3

The count 1410 indicates that 5 bytes are to be modified. The five bytes following the count field 1410, data field 1412, contain the desired bytes to replace the five bytes 3–7 of existing load format 1402. The stop location for this first modification is then first stop location=3+5−1=7

Thus, the values contained in bytes 3–7 of load format 1402 are replaced with the values in data field 1412, as shown by bytes 3–7 of the desired load format 1406.

The first byte of the second modification is a X'00', having a high order bit set to "0". This indicates that the offset field 1414 is a 2-byte offset. Offset field 1414 has the value X'0006', indicating that the second modification begins 6 bytes after the first stop location. Thus, the second start location is second start location=7+6=13

The count field 1416 for the second modification has a value of X'02', indicating that two bytes are to be modified. Data field 1418, which follows count field 1416, contains two bytes of replacement values. Thus, the second modification begins at byte 13 and modifies two bytes of existing load format 1402. These two bytes, X'9192', can be seen located in the desired load format 1406 at bytes 13 and 14.

Figure 15A:
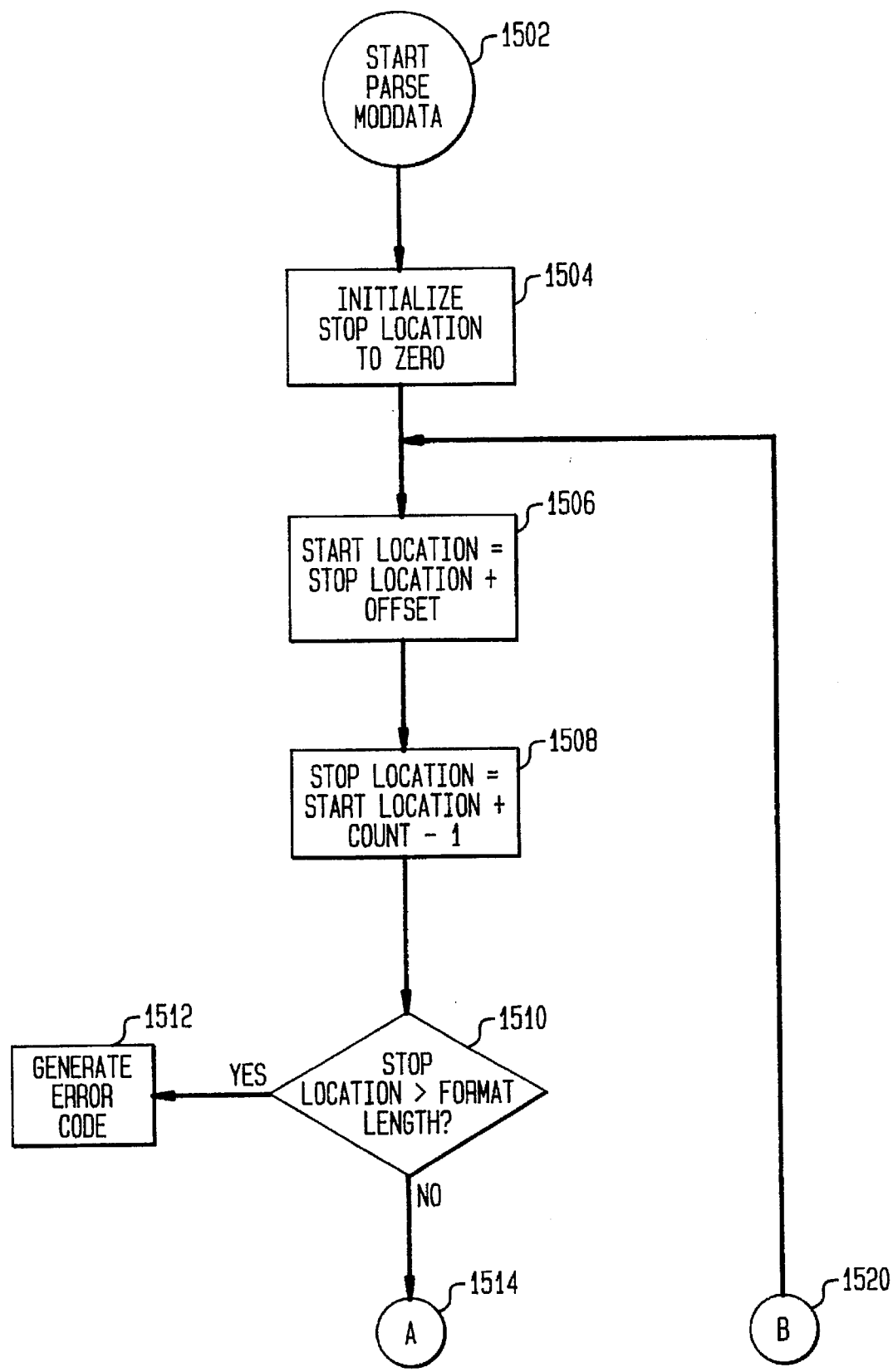
FIGS. 15A and 15B illustrate the process to parse the Modify Existing Format of the present invention.
Figure 15B:
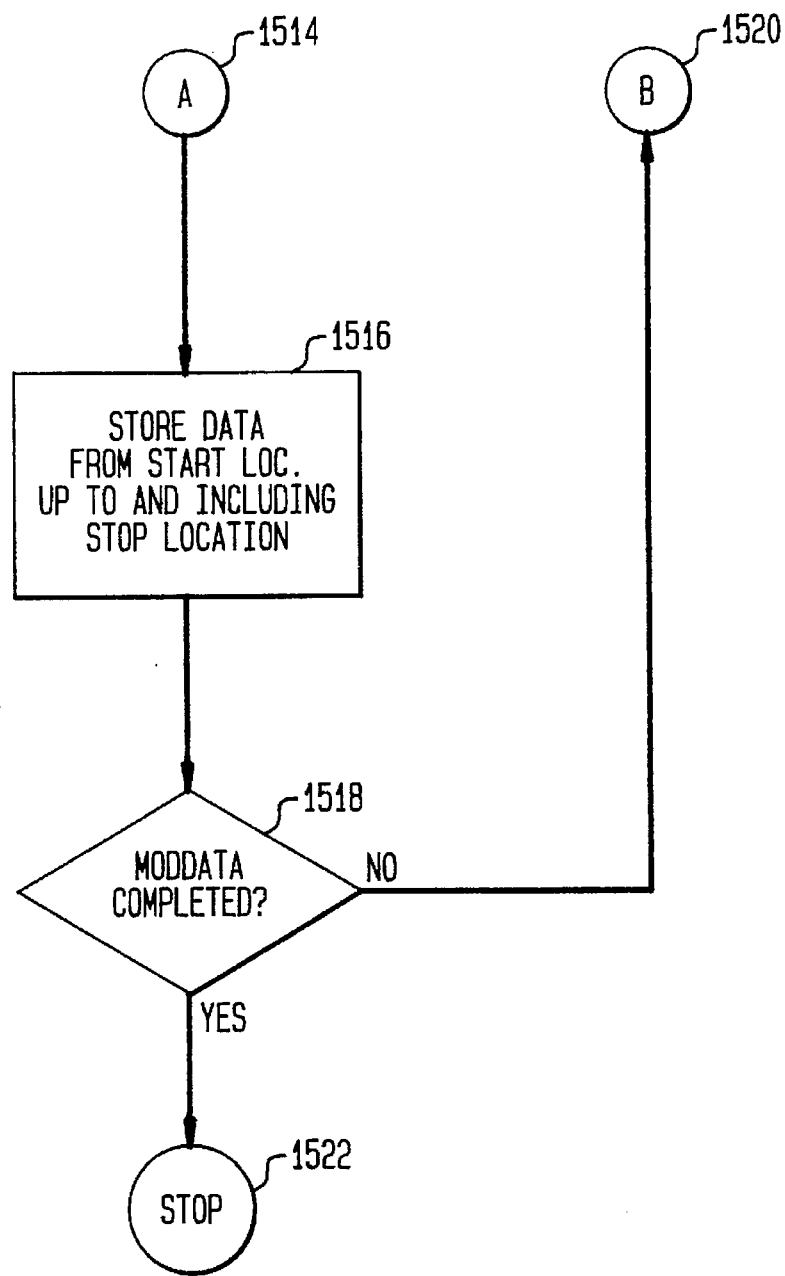

FIGS. 15A and 15B illustrate the process that may be used in parsing Modify Existing Format 1404 shown in FIG. 14. The process begins at start parse Modify Existing Format 1502. First, the stop location is initialized to 0 in step 1504. This ensures that the Modify Existing Format byte calculations begin at the beginning of load format data. Next, in step 1506, the start location for the first modification is calculated by determining the offset and adding it to the stop location. For the first modification, the stop location is 0 and the start location is equal to the offset value. Once the start location is determined, the stop location is determined in step 1508. The stop location is determined by adding the value in the count field to the start location and then subtracting one to take account for the modification beginning with the start address.

If the resulting stop location is determined to be larger than the length of the format data which is to be modified, step 1510, an error is generated in step 1512. In this case, the format will be modified only up to the detection of the error. Hence, the entire format is left in an indeterminable state.

Process continues though connector A 1514 to step 1516 wherein the data field which follows the count field in Modify Existing Format is taken and stored in the format data. The data is stored starting at the start location and continues up through the stop location.

The above process is continued for the length of the Modify Existing Format since the Modify Existing Format can contain multiple instances of offset/count/data fields. Thus, in step 1518, it is determined if there are additional modifications which need to be made to the format data. If not, the process completes at step 1522. If so, the above process is repeated by transferring control through connector B 1520 to step 1506.

The SLU indicates support of the Modify Existing Format function via the Format Storage Aux Device Query Reply. An additional Self Defining Parameter is added to indicate this support as shown below in Table 19.

TABLE 19

Format Storage AUX Device Query Reply Self Defining Parameter Indicating Support of MODDATA

| BYTE | CONTENT DESCRIPTION | Comments |
|------|---------------------|----------|
| 0 | Structured Field Length | X'03' - Indicates the length of SDP is 3 bytes |
| 1 | SDP Type | X'02' - Additional operands supported in Load Format |
| 2 | Additional LOAD FORMAT TYPES | X'07' - Modify Format operand (see Table 18) |

In the self defining parameter provided in Table 19, the first byte, byte 0, provides the length of the structured field. This indicates that the self defining parameter is 3 bytes in length. The second byte, byte 1, has a value of X'02'. This indicates that the Load Format Storage structured field contains additional operands (see Tables 17 and 18, byte 6). The third byte, byte 2, has a value of X'07'. This indicates that the structured field contains additional load format types and, in particular, the Modify Existing Format of the present invention (see Table 18, bytes 47-n).

VI. Reset of Format Group

In the present 3270 data stream architecture a number of functions which are routinely performed either by the operator or the PLU application program cause the Format Group Selection to be reset. This causes the PLU application to automatically resend the Select Format Group Structured Field prior to being able to use a loaded format. The Select Format Group Structured Field is approximately 20 bytes in length.

The present invention eliminates this transmission by providing the PLU application with the capability of informing the SLU not to reset the Format Group.

A structured field with the appended self-defining parameter is used by the PLU application to enable or disable the operator call-up function of the Local Format Storage feature. The format of the Set Partition Characteristics Structured Field is provided below in Table 20.

TABLE 20

Format of Set Partition Characteristics Structured Field

| BYTE | BIT | CONTENT | MEANING |
|------|-----|---------|---------|
| 0, 1 | | X'000A' | Length of structured field |
| 2, 3 | | X'0F08' | Set partition characteristics identifier |
| 4 | | X'FF' | Partition ID - must be X'FF' |
| 5, 6 | | X'0000' | Flags - Must be zeros |

The reset of the Format Group of the present invention is implemented by adding to the Set Partition Characteristics structured field the Self Defining Parameter shown below in Table 21.

TABLE 21

Set Partition Characteristics Self Defining Parameter of the Present Invention

| BYTE | BIT | CONTENT DESCRIPTION | Comments |
|---|---|---|---|
| 0 | | Structured Field Length | X'02' - Indicates the length of the SDP is 2 bytes |
| 1 | | SDP Type | X'06' - Reset Format Group Supported |

Thus, the resetting of the Format Group may now be inhibited until a subsequent Set Partition Characteristics Structured field is sent. This translates into significant savings since the 20 bytes select format group structures field. Support of the Set Partition Characteristics Self Defining Parameter is indicated by a self defining parameter in the Format Presentation Query Reply. This is shown below in Table 22.

TABLE 22

Set Partition Characteristics Self Defining Parameter Indicating Support of Reset Format Group of the Present Invention

| BYTE | CONTENT DESCRIPTION | Comments |
|---|---|---|
| 0 | Structured Field Length | X'02' |
| 1 | SDP Type | X'06' - Support SDP X'06' of Set Partition Characteristics |

VII. Reduced 3270 Data Stream Transmission

One advantage of the present invention is the elimination of data bytes in the 3270 transmission. This improves line utilization and hence reduces network costs. For example, in a 3270 data stream which has been optimized to achieve a savings of approximately 80%, the implementation of the present invention has provided an additional 4.5% savings. That is, utilization decreased from 20% to 15.5% for a saving of approximately 22%. Even greater savings are achieved when the present invention is implemented in non-compressed 3270 data streams. In addition, these saving were achieved with the implementation of four of the five above improvements. In particular, the Modify Existing Format improvement was not included in the tests which resulted in the above percentages.

With the increased utilization of the 3270 data stream architecture, additional savings are generated. For example, given that an approximate 22% saving is achieved, the additional memory which is now available in the SLU may now be used to store other features, such as load formats. The 3270 data stream architecture contains the ability to transmit a number of load formats which will be used often from the PLU to the SLU a single time. These load formats may be quite large, in the order of 800-1200 bytes. When these load formats have to be referenced in future transmissions, a single byte identifier is transmitted to the SLU which identifies a specific one of the previously transmitted load formats.

For load formats which are not stored in the SLU, the PLU has to transit the complete load format when required. Thus, for every load format which is stored in the SLU, a single byte identifier is transmitted rather than the complete 800-1200 byte load format. By reducing the 3270 data stream transmission traffic, additional load formats are now able to be stored in the SLU, thereby achieving greater transmission efficiency.

For the modify existing formatthe savings which are achieved are greatest for smaller modifications. For example, if 80% of the load format was to be modified, the improved 3270 data stream architecture would transmit the 80% replacement bytes as compared with the present method of transmitting the complete load format. However, if a single byte of a load format is to modified, then only that single replacement byte is transmitted in the modify existing format rather that the complete load format. Thus, the saving achieved are greatest for the smaller modifications.

The example provided in this Specification is substantially smaller than similar data stream transmissions. In the example, the present invention modified approximately 40% of the load format while reducing the data stream by approximately 30%. When applied to the substantially larger load format storage data streams results in significant reductions in the overall data stream transmission. The inventors has found that the modify format structured field of the present invention eliminates approximately 75% of the Load Format Storage transmission traffic which presently exists in 3270 data stream traffic.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a networked system including a primary logical unit and a secondary logical unit, wherein a data stream, having an augmented 3270 data stream architecture, is passed between said primary logical unit and said secondary logical unit to transmit data and information, wherein said data stream includes an enhanced buffer control order designating a desired buffer address that is a specific number of address locations from a current buffer address for providing improved 3270 data stream performance with reduced transmission traffic, said system comprising:

generating means, operably connected to said primary logical unit, for generating said buffer control order, said generating means concatenating a buffer control order code indicating a type of buffer control order with a buffer control order address, said buffer control address including an increment value to designate a number of buffer locations from a current buffer address to said desired buffer address, wherein said increment value is a 6-bit increment value configured to designate said desired buffer address when said desired buffer address is within 64 buffer locations of said current buffer address; and execution means, operably connected to said secondary logical unit, for executing said buffer control order.

2. The system of claim 1, wherein said buffer control order further comprises flag bits for designating that said buffer address contains said increment valuesaid flag bits utilizing a reserved combination of bit values.

3. The system of claim 1,
wherein said primary logical unit requests that said secondary logical unit indicate its capability of supporting said buffer control order by sending said secondary logical unit a query structured field, and
wherein said secondary logical unit indicates its capability of supporting said increment value by responding to said query structured field by sending said primary logical unit a user area query reply structured field.

4. The system of claim 1, wherein said buffer control order is a set buffer address buffer control order configured to utilize said increment value to specify a desired buffer address from which operations of said secondary logical unit are to start and/or continue.

5. The system of claim 1, wherein said buffer control order is a repeat to address buffer control order, comprising:

a repeat character, wherein said repeat to address buffer control order is configured to utilize said increment value to specify a buffer stop address, and further wherein said secondary logical unit stores said repeat character from said current buffer address to said buffer stop address.

6. The system of claim 1 wherein said buffer control order is an erase unprotected to address buffer control order configured to utilize said increment value to specify a buffer stop address, and further wherein said secondary logical unit stores a null character from said current buffer address to said buffer stop address.

7. The system of claim 4, wherein said set buffer address buffer control order is 2 bytes in length.

8. In a networked system having a primary logical unit and a secondary logical unit, wherein a data stream, having an augmented 3270 data stream architecture, is passed from said primary logical unit to said secondary logical unit, wherein said data stream includes an enhanced set attribute order for improved 3270 data stream performance with reduced transmission traffic, and wherein said secondary logical unit includes a display station containing a presentation space of one or more formatted data fields having characteristics designated by an attribute character in said data stream, said system comprising:

generation means, operably connected to said primary logical unit, for generating said set attribute order including a start field order configured to create a formatted data field in said presentation space, said formatted data field having field attributes designated by said attribute in said set attribute order, wherein said set attribute order also comprises an attribute value field only when a present one of said one or more formatted data fields has characteristics that are different that an immediate previous data field of said one or more data fields; and execution means, operably connected to said secondary logical unit, for executing said set attribute order.

9. The system of claim 8, wherein said set attribute order further comprises:

a set attribute order code; and an attribute type comprising said start field order.

10. The system of claim 8, wherein said attributes include:

color;

extended highlighting; and programmed symbols.

11. The system of claim 8, wherein said attribute character is reset to a default value by a power-on-reset and a write-type command.

12. The system of claim 8, wherein said secondary logical unit indicates its ability to support said set attribute order and said start field order by sending said primary logical unit a user area query reply self defining parameter.

13. In a networked system having a primary logical unit and a secondary logical unit, wherein a data stream, having an augmented 3270 data stream architecture, is passed Rum said primary logical unit to said secondary logical unit, wherein said data stream includes an enhanced set attribute order for improved 3270 data stream performance with reduced transmission traffic, and wherein said secondary logical unit includes a plurality of unprotected buffer locations, said system comprising:

a first generation means, operably coupled to said primary logical unit, for generating said set attribute order, said set attribute order comprising a repeat character utilized by said secondary logical unit in conjunction with subsequent repeat to address orders, and one or more of said subsequent repeat to address orders following said set attribute order, each of said one or more of said subsequent repeat to address orders designating a buffer stop address; and a second generation means, operably coupled to said secondary logical unit, for storing said repeat character written to all of said unprotected buffer locations from a current buffer address to said buffer stop address.

14. The system of claim 13, wherein said set attribute order further comprises:

a set attribute order code; and an attribute type indicating that said set attribute order contains said repeat character.

15. The system of claim 13, wherein said secondary logical unit indicates its ability to support said set attribute order and said repeat to address order by transmitting a user area query reply self defining parameter to said primary logical unit.

16. The system of claim 13, wherein said repeat character is reset to a default value by a power-on-reset and a write-type command.

17. In a networked system having a primary logical unit and a secondary logical unit, wherein a data stream having an augmented 3270 data stream architecture, is passed between said primary logical unit and said secondary logical unit, wherein said data stream includes a modify existing format data stream for improved 3270 data stream performance with reduced transmission traffic, and wherein said secondary logical unit having load format data located in a load format storage area, said system comprising:

generation means, operably connected to said primary logic unit, for generating said modify, existing format data stream designating one or more specific portions of the load format data which are to be modified, wherein each of said specific portions begins at a load format data start location and ending at a load format data stop location, and wherein, for each of said specific portions of said load format data, said modify existing format data stream comprises a sequence of fields, said sequence of fields comprising:

an offset field indicating said load format data start location, a modification data field containing one or more modification data bytes, wherein said modification data replaces one of said one or more specific portions of said load format data, and a count field indicating the number of load format data bytes which are to be modified, wherein only said one or more specified portions of said load format data are transmitted to said secondary logical unit; and modification means operably connected to said secondary logic unit, for modifying said designated one or more specific portions of said load format data in accordance with said modify existing format data stream.

18. The system of claim 17, wherein said modify existing format data stream is contained in a load format storage structured field.

19. The system of claim 18, wherein said load format data stop location is initialized to zero.

20. The system of claim 18, wherein said secondary logical unit indicates its ability to support said modify existing format data stream data field via a self defining parameter appended to a load format storage auxiliary query reply.

21. In a networked system comprising a primary logical unit and a secondary logical unit, wherein a data stream-having an augmented 3270 data stream architecture, is passed between said primary logical unit and said secondary logical unitwherein said data stream includes a select format group structured field for improved 3270 data stream performance with reduced transmission traffic, said system comprising:
   means for controlling the transmission of said select format group structured field from said secondary logical unit to said primary logical unit, including,
   first means for generating a first self defining parameter configured to be sent by said primary logical unit to said secondary logical unit, and
   second means for generating a second self defining parameter configured to, be sent from said secondary logical unit to said primary logical unit, said second self defining parameter indicating that said transmission of a select format group structured field by said secondary logical unit may be controlled by said primary logical device.

22. The system of claim 21, wherein said self defining parameter is appended to a set partition attribute structured field.

23. A networked system, comprising:
   a first logical unit for storing data in a buffer, said buffer comprising a plurality of memory locations, said first logical unit storing data in said plurality of memory locations according to a current buffer address, said first logical unit including a first means for maintaining said current buffer address;
   a second logical unit for sending data to be stored in said buffer, said second logical unit including a second means for maintaining said current buffer address, said second logical unit generating a buffer control order including an increment value to designate a specific number of locations from said current buffer address to a desired buffer address, wherein said increment value constitutes less bits than an absolute address of said desired buffer address; and
   network communications means, coupled to said second logical unit and said first logical unit, for transferring data and control messages between said second logical unit and said first logical unit using an augmented 3270 data stream architecture, said data and control messages including said buffer control order for improved 3270 data stream performance, wherein said first logical unit uses said increment value to store data received in one of said plurality of memory locations corresponding to said desired buffer address.

24. The system of claim 23, wherein said buffer control order further comprises:
   a buffer control order code indicating a type of buffer control order.

25. The system of claim 24, wherein said increment value is a 6-bit increment value configured to designate said desired buffer address when said desired buffer address is 64 buffer locations or less from said current buffer address.

26. The system of claim 24, wherein said buffer control order further comprises flag bits for designating that said buffer address contains said increment value.

27. The system of claim 23, wherein the first logical unit requests that the second logical unit indicate its capability of supporting said buffer control order by sending the second logical unit a query structured field, and wherein the second logical unit indicates its capability of supporting said buffer control order by responding to said query structured fieldby sending the first logical unit a user area query reply structured field indicating said support of said buffer control order.

28. The system of claim 23, wherein said buffer control order is a repeat to address buffer control order comprising a repeat character, wherein said repeat to address buffer control order is configured to utilize said increment value to specify a buffer stop addressand further wherein said second logical unit stores said repeat character from said current buffer address to said buffer stop address.

29. The system of claim 23, wherein said buffer control order is an erase unprotected to address buffer control order configured to utilize said increment value to specify a buffer stop address and further wherein said second logical unit stores a null character from said current buffer address to said buffer stop address.

30. A networked system, comprising:
   a primary logical unit;
   a secondary logical unit, coupled to said primary logical unit, including a display station containing a presentation space of one or more formatted data field, each having one or more field attributes; and
   a communications means, operably connected to said primary and secondary logical units, having an augmented 3270 data stream architecture, including, generating means for generating an enhanced set attribute order for improved 3270 data stream performance with reduced transmission traffic, said set attribute order including a start field order configured to create a formatted data field in said presentation space, said formatted data field having attributes designated by said attribute character in said set attribute order, wherein said set attribute order also comprises an attribute value field only when a present one of the one or more formatted data fields has characteristics that are different that an immediate previous data field of the one or more data fields of said presentation space,
   executing means, responsive to said generation means, for executing said attribute order.

31. The system of claim 30, wherein said set attribute order further comprises:
   a set attribute order code; and
   an attribute type comprising said start field order.

32. The system of claim 30, wherein said second attribute character is reset to a default value by a power-on-reset and a write-type command.

33. The system of claim 30, wherein said secondary logical unit indicates its ability to support said set attribute order and said start field order by sending said primary logical unit a user area query reply self defining parameter.

34. A networked systemcomprising:
   a primary logical unit;
   secondary logical unit, coupled to said primary logical unit, said secondary logical unit comprising a plurality of unprotected buffer locations; and
   a communications means, coupled to said primary logical unit and said secondary logical unit, for transferring data and control messages between said primary logical unit and said secondary logical unit including a set attribute order for improved data stream performance with reduced transmission traffic, said set attribute order comprising a repeat character for reference by said secondary logical unit in conjunction with subsequent repeat to address orderssaid set attribute order and said subsequent repeat to address orders being generated by said primary logical unit, each of said one or more of said subsequent repeat to address orders designating a buffer stop address, wherein said secondary logical unit stores said repeat character to all of said unprotected buffer locations from a current buffer address to said buffer stop address.

35. The system of claim 34, wherein said set attribute order further comprises:

a set attribute order code; and an attribute type indicating that said set attribute order contains said repeat character.

36. The system of claim 34, wherein said secondary logical unit is configured to transmit a user area query reply self defining parameter to said primary logical unitsaid user area query reply self defining parameter indicating said secondary logical unit has said capability to support said set attribute order and said repeat to address order.

37. The system of claim 34, wherein said repeat character is reset to a default value by a power-on-reset and a write-type command.

38. A networked system, comprising:

a primary logical unit;

a secondary logical unit, coupled to said primary logical unit; and a communications means coupled to said primary logical unit and said secondary logical unitfor transferring data and control messages between said primary logical unit and said secondary logical unit using an augmented 3270 data stream architecture generated by said primary logic unit, thereby providing improved 3270 data stream performance with reduced transmission traffic-said communications means including format load data located in a format load storage area, including, a modify existing format data stream designating one or more specific portions of said load format data which are to be modified, said one or more specific portions containing only portion of said load format data, wherein each of said specific portions begins at a load format data start location and ending at a load format data stop location, and whereinfor each of said specific portions of said load format data, said modify existing format data stream comprises a sequence of fields for each of said one or more specific portionseach of said sequence of fields comprising:

an offset field indicating said load format start location, a count field indicating said number of load format data bytes which are to be modified, and a modification data field containing one or more modification data bytes, wherein said modification data replaces one of said one or more specific portions of said load format data, and wherein only said one or more specified portions of said load format data are transmitted to said secondary logical unit user computer system, and wherein said secondary logical unit indicates its ability to support said modify existing format stream in response to a query from said primary logical unit.

39. The system of claim 38, wherein said modify existing format data stream is contained in a load format storage structured field.

40. The system of claim 38, wherein said stop load format data location is initialized to zero.

41. The system of claim 38, wherein said secondary logical unit indicates its ability to support said modify existing format data stream via a self defining parameter appended to a load format storage auxiliary query reply.

42. In a networked system having a primary logical unit a secondary logical unit, operably coupled by a network, a method for causing a character to be repeated in a plurality of unprotected buffer locations in said secondary logical unit, said method comprising of the steps of:

(1) transmitting from said primary logical unit to said secondary logical unit over said network an enhanced set attribute order having a repeat character for reference by said secondary logical unit in conjunction with subsequent repeat to address orders;

(2) transmitting said subsequent repeat to address orders from said primary logical unit to said secondary logical unit, each of said subsequent repeat to address orders designating a specific buffer stop address; and (3) writing said repeat character in said plurality of unprotected buffer locations from a current buffer address to said buffer stop address in response to said step of transmitting said subsequent repeat to address orders.

43. The method of claim 42, wherein said secondary logical unit writes said repeat character to all of said unprotected buffer locations from said current buffer address to said stop address.

44. The method of claim 42, further comprising the steps of:

(3) transmitting from said secondary logical unit to the primary logical unit a set attribute order indicating that said secondary logical unit support said repeat to address order in a user area query reply self defining parameter.

* * * * *

UNITED STATES PATENT AND TRADEMARK OFFICE
CERTIFICATE OF CORRECTION

PATENT NO. : 5,649,101　　　　　　　　　　　　　　　　　　　　　　　　　　　　Page 1 of 1
APPLICATION NO. : 08/569322
DATED : July 15, 1997
INVENTOR(S) : James Merwin Mathewson, II It is certified that error appears in the above-identified patent and that said Letters Patent is hereby corrected as shown below:

Please amend section [63] on the face of the patent as shown:

--Continuation of Ser. No. ~~116,640~~ 08/161,640 Dec. 3, 1993, abandoned.--

Signed and Sealed this

Eighteenth Day of May, 2010

David J. Kappos
*Director of the United States Patent and Trademark Office*